(12) United States Patent
Zhu

(10) Patent No.: US 6,469,822 B1
(45) Date of Patent: *Oct. 22, 2002

(54) OPTICAL PHASED ARRAY DEVICE AND THE METHOD THEREFOR

(76) Inventor: Yuxin Zhu, 971 Chelsea La., Schaumburg, IL (US) 60193

( * ) Notice: Subject to any disclaimer, the term of this patent is extended or adjusted under 35 U.S.C. 154(b) by 0 days.

This patent is subject to a terminal disclaimer.

(21) Appl. No.: 09/530,531

(22) PCT Filed: Nov. 2, 1998

(86) PCT No.: PCT/CN98/00262

§ 371 (c)(1),
(2), (4) Date: May 1, 2000

(87) PCT Pub. No.: WO99/24866

PCT Pub. Date: May 20, 1999

(30) Foreign Application Priority Data

Nov. 5, 1997 (CN) .......................... 97119771 A

(51) Int. Cl.[7] .............................. G02F 1/29; G02F 1/035
(52) U.S. Cl. ....................... 359/316; 359/279; 359/315; 359/319; 359/578; 359/619; 359/627; 385/3; 385/14; 349/202
(58) Field of Search ................................. 359/279, 315, 359/316, 578, 619, 621–624, 627; 349/202; 385/3, 14

(56) References Cited

U.S. PATENT DOCUMENTS

| | | | | |
|---|---|---|---|---|
| 3,650,602 A | 3/1972 | Lee et al. | ............... | 359/316 |
| 4,386,827 A | 6/1983 | Scitres | ............... | 359/315 |
| 4,706,094 A | 11/1987 | Kubick | ............... | 343/754 |
| 4,937,539 A | * 6/1990 | Grinberg et al. | ............... | 330/4.3 |
| 4,964,701 A | * 10/1990 | Dorschner et al. | ............... | 349/202 |
| 5,059,008 A | 10/1991 | Flood | ............... | 359/196 |
| 5,061,048 A | 10/1991 | Hayden | ............... | 359/315 |
| 5,093,740 A | * 3/1992 | Dorschner et al. | ............... | 349/202 |
| 5,093,747 A | 3/1992 | Dorschner | ............... | 359/316 |
| 5,126,869 A | 6/1992 | Lipchak | ............... | 349/202 |
| 5,212,583 A | * 5/1993 | Vali et al. | ............... | 359/245 |
| 5,233,673 A | 8/1993 | Vali | ............... | 385/3 |
| 5,253,033 A | * 10/1993 | Lipchak et al. | ............... | 356/5 |
| 5,539,567 A | * 7/1996 | Lin et al. | ............... | 359/281 |
| 5,943,159 A | * 8/1999 | Zhu | ............... | 359/316 |

OTHER PUBLICATIONS

Brookner, "phased–array Radars," Scientific American. Feb. 1985, pp. 94–102.
Resler et al, "High–efficiency Liquid–crystal optical phased–array beam steering", optics letters, May 1, 1996, vol. 21, No. 9, pp. 689–691.
P.F. McManamon, et al, "optical phased array technology", Proceedings of the IEEE, v. 84, No. 2, Feb. 1996, pp. 268–298.
J.A. Thomas, "A PLZT–based Dynamic Diffractive optical Element for High speed, Random–Access Beam Steering", optical scanning systems, Design and Applications, Proc. SPIE 3131, 1997, pp. 124–132.

* cited by examiner

Primary Examiner—Evelyn A Lester

(57) ABSTRACT

An optical irregular phased-array is disclosed. The effective positions of the phase-controlled elements in the phased-array form an irregular array, such that the size of each phase-controlled element can be much larger than the wavelength of the light without having multiple beam problem. The effective phased-array is a virtual array of effective point-source of light, which is generated by an array of lenses or mirrors. An array of space-fed phase-modulators that is coupled with the array of lenses or mirrors provides means of adjusting the phase of the light from each effective point-source of light. While, the array of phase-modulators and array of lenses or mirrors can all be a regular array, which are simple in structure. A sub-array technique is provided to greatly reduce the controlling lines.

40 Claims, 31 Drawing Sheets

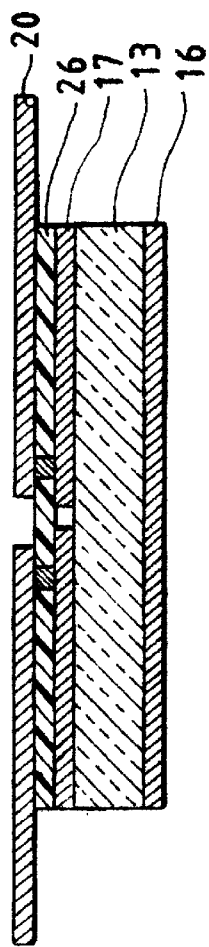
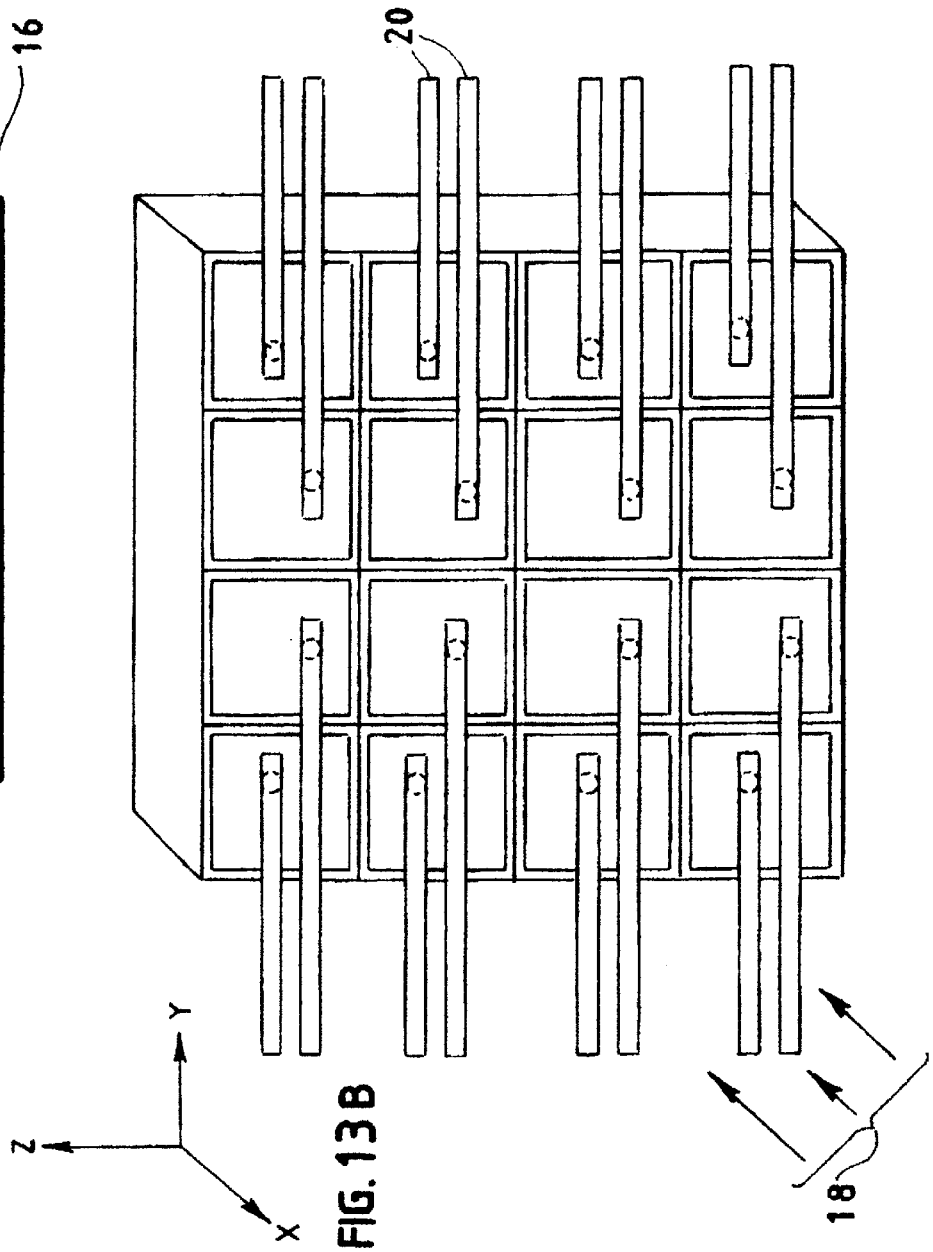
FIG. 13 A
FIG. 13 B

OPTICAL PHASED ARRAY DEVICE AND THE METHOD THEREFOR

BACKGROUND OF THE INVENTION

The present invention relates to an optical phased-array that electronically steers a beam of light.

Phased-array is an array of plurality of phase-controlled element. By adjusting the phase relationship among the electromagnetic waves (or other waves such that sonic wave) radiated from each phase-controlled element, the electromagnetic waves radiated from each phase-controlled element become in-phase in a given direction (or at a give position), thus, a constructive interference is formed, and therefore, the phase-array produces a high intensity beam in that direction. In other directions, the electromagnetic waves from each phase-controlled element do not meet the in-phase condition, and are cancelled out with each other due to the interference, therefore, the radiation from the phased-array is close to zero. The geometric dimension of the phased-array (i.e. the aperture) determines the resolution of the phased-array (i.e. the width of the beam). The number of the phase-controlled element is related to the intensity of the beam. The significant advantage of a phased-array device is that the phase relationship among the electromagnetic waves radiated from each phase-controlled element can be adjusted electronically, therefore, the beam can be steered at extremely high speed.

For the prior art, to ensure that the phased-array radiates only one high intensity beam in the given direction, and that the radiation in other directions is close to zero, the distance between the phase-controlled elements (i.e. the center-to-center distance of the adjacent phase-controlled elements) must be less than half of the wavelength for which the phased-array is concerned (details will be in the following).

It is well known that light is also an electromagnetic wave. In the frequency range of light, the wavelength of the visible light is around 0.4 to 0.7 micrometer, the wavelength of infrared is around 0.7 to several hundreds micrometer, and the wavelength of the ultraviolet is around 0.4 to 0.04 micrometer. Now, let's use the 0.5 micrometer wavelength visible light as an example in the discussion of the prior optical phased-array technology. As mentioned above, to ensure that the phased-array radiates only one high intensity beam in the given direction while the intensity of the radiation is close to zero in other directions, the center-to-center distance between the phase-controlled elements has to be less than 0.25 micrometer. Thus, the size of the phase-controlled element itself must also be less than 0.25 micrometer. At present, the light source as the phase-controlled element, which is phase controllable, and is small enough in size does not exist yet. Therefore, the phased-array in optical frequency is to use a coherent beam passing through many space-phase-modulators to create many beams with particular phase relationship among them, i.e. each phase-modulator produces one beam with a given phase. Here, each phase-modulator is one phase-controlled element as mentioned above. Phase-modulator consists of two electrodes and electro-optical material between the two electrodes. The refractive index of the electro-optical material can be alerted in a certain rang according to the electrical field between the two electrodes, which alerts the optical path length as a beam of light travel trough the phase modulator, and therefore results phase modulation (i.e. phase shifting). The electrical field between the two electrodes is controlled by adjusting the electrical potential on the two electrodes with a controller.

For the sack of the convenience, in this document, when the structure of the phased-array and phase-controlled element are concerned, width means the dimension in the direction perpendicular to the boresight of the phased-array (or simply called as dimension), the thickness means the dimension along the boresight of the phased-array.

Referring now to FIG. 1, a cross-section view of a prior art optical phased-array device. It consists of a controller 11 and an array of optical phase-modulators 12 (it will be called as array of phase-modulators in the following text for simplicity). The array of phase-modulators consists of plurality of phase-modulators. Since the electro-optical material 13 is the liquid-crystal, the phase-modulator array 12 possesses also a front window 14 and a rear window 15. Window 14 and window 15 are usually flat plates, and parallel to each other. They are transparent in the optical frequency rang that they are working with. Each phase-modulator has a control electrode, denoted as $17_0, 17_1, \ldots, 17_9$, collectively referred as control electrodes 17. Phase-modulator consists of control electrode 17, common electrode 16 and liquid-crystal 13. Common electrode 16 and control electrode 17 are transparent in optical frequency range concerned. FIG. 1 illustrates the cross-section view of a one dimensional phase-modulator array. Control electrode 17 are plurality of parallel strip electrodes. The width of the strip electrode is denoted as w. The spacing between the electrodes is denoted as p. The center-to-center distance between adjacent electrodes is denoted as d. d=p+w. The incident light 18 enters the phase-modulator array 12 from the rear window 15. Light is phase-modulated by each modulator, and the emitted light from each modulator becomes in-phase in direction θ, thus, a beam 19 is generated in direction θ. The 46 represents the wavefront. The control lines 20, between the phase-modulator array 12 and controller 11 is for carrying the control signal. The prior art requires that the center-to-center distance d to be less than the wavelength in order to ensure that the phased-array produces only one beam in the given direction. Otherwise, there will be other beams in other direction also, which is not desirable. Therefore, prior art has to limit the width of the phase-modulator w (FIG. 1) to be less than the wavelength. Because of this, it produces the following problems:

1. For a give aperture of a phased-array, since the phase-modulator is very small, the required number of the phase-modulator will be very large. For example, for the wavelength of 0.5 micrometer, 20,000 rows of phase-modulator will be needed for each center meter aperture. This makes the structure of the phased-array device very complex, cost, and difficult to fabricate.
2. The spacing p between the electrodes is limited by the insulation requirement and fabrication process. For a given material and fabrication technology, the minimum p achievable can be regarded as a constant. Obviously, the smaller the width of the phase-modulator w, the larger the portion of the aperture that is occupied by the spacing, and therefore, the lower the filling rate. For example, at wavelength of 0.5 micrometer, assuming w and p are all 0.5 micrometer, then 50% of the aperture area is wasted, only half of the incident light is useful.
3. When the dimension of the phase-modulator (i.e. w. Same in the following) is very small, the light entering the phase-modulator significantly diverges due to diffraction, part of the light will enter neighboring phase modulators, which disturbs the light emitted from each phase-modulator, and only a part of light emitted actually possesses the correct phase. Since the thickness of the phase-modulator is much large than the width (e.g. the thickness is larger than 10 μm), the diverging of the light due to diffraction is very significant.

4. When the dimension of the phase-modulator is very small, the width of the electrode is also very small. Since the thickness of the phase-modulator is much larger than its width, i.e. the distance between the electrodes are much larger than the width of the electrode itself, the infringing effect will significantly affect the uniformity of the electrical field within the phase-modulator. Besides, since the distance between the electrodes is much larger than the width of the electrodes, the electrical field of neighboring phase-modulators also interferes with each other significantly. Even if not taking count the disturb from the diverging light of neighboring phase-modulator, the effect due to infringing electrical field would be significant enough to cause phase error in the light travel through each phase modulator.

The above four issues are the existing problems of the prior art. The first and second problem are related to the fabrication cost and the performance, while the third and forth problems are the fundamental issues of the prior art. Because of these, so far, there is no practical optical phased-array device in the market.

Now, let's analyze the reason that the distance between phase-controlled elements has faced the limitation in the prior art. FIG. 2 illustrates a phased-array of eight phase-controlled elements, $21_0$–$21_7$, collectively referred as 21. The light with given phase emits from each phase-controlled element. For simplicity, each phase-controlled element is assumed to be a point source of light. If the light from each point source of light are all in-phase in the direction θ, therefore form a constructive interference, it is said "the phased-array produces a beam of light in the θ direction". In FIG. 2, that beam of light is denoted as $19_\theta$. The distance between adjacent point source of light is denoted as d1, bx;1d2, ..., d7. The optical retardation in the θ direction is denoted as δ1, δ2, ..., δ7. From the geometrical relationship, the followings are obtained:

$$\delta 1 = d1 \sin \theta \qquad (1.1)$$

$$\delta 2 = d2 \sin \theta \qquad (1.2)$$

$$\delta 7 = d7 \sin \theta \qquad (1.3)$$

In order to make the light from each point source of light all in-phase in θ direction, it is necessary to adjust the phase of the light from each point source of light to compensate the optical retardation mentioned above. Therefore, the phase of the light from each point source of light must satisfy the following relationship:

The phase of $21_1$ is ahead of $21_0$ by δ1 $(2\pi/\lambda)$,

The phase of $21_2$ is ahead of $21_1$ by δ2 $(2\pi/\lambda)$,

The phase of $21_7$ is ahead of $21_7$ by δ7 $(2\pi/\lambda)$, where, λ is the wavelength of the light. Taking into account the periodicity of the wave, shifting the phase by an integer number of $2\pi$ do not make any difference. For example, denoting δ1 $(2\pi/\lambda) = k1(2\pi) + \omega 1$, where k1 is an integer. Whether shifting the phase by $k1(2\pi) + \omega 1$ or by $\omega 1$, the effect is the same. Therefore, in practice, the phase shifting is always determined according to ω1 rather $k1(2\pi) + \omega 1$. In this document, when the phase shifting is mentioned, it always means that the $2\pi$ phase rest has been taken into account unless otherwise explicitly declared.

Now, let's consider the possibility that the light from each phase-controlled element are also in-phase in other directions. To answer this question, let's analyze the array illustrated in FIG. 3. This array is same with the array in FIG. 2. Assuming the direction γ which is different from direction θ, and denote optical retardation of the light from each phase-controlled element in the direction γ as α1, α2, ..., α7. From the geometry relationship, we have:

$$\alpha 1 = d1 \sin \gamma, \qquad (2.1)$$

$$\alpha 2 = d2 \sin \gamma, \qquad (2.2)$$

$$\alpha 7 = d7 \sin \gamma. \qquad (2.3)$$

The phase difference of the light from each phase-controlled element in direction γ is denoted as $\phi 1$, $\phi 2$, ..., $\phi 7$. They contain two parts: One is the original phase difference among the point source of light (i.e. the phase shifting that has been implemented in order to achieve all the light in-phase in the direction θ); another is the phase difference due to the optical retardation in direction γ. Therefore, the phase difference between adjacent phase-controlled elements in direction γ is as the following:

$$\phi 1 = \delta 1 (2\pi/\lambda) - \alpha 1 (2\pi/\lambda), \qquad (3.1)$$

$$\phi 2 = \delta 2 (2\pi/\lambda) - \alpha 2 (2\pi/\lambda), \qquad (3.2)$$

$$\phi 7 = \delta 7 (2\pi/\lambda) - \alpha 7 (2\pi/\lambda). \qquad (3.3)$$

Or rewriting as:

$$\phi 1 = d1 (\sin \theta - \sin \gamma)(2\pi/\lambda), \qquad (4.1)$$

$$\phi 2 = d2 (\sin \theta - \sin \gamma)(2\pi/\lambda), \qquad (4.2)$$

$$\phi 7 = d7 (\sin \theta - \sin \gamma)(2\pi/\lambda). \qquad (4.3)$$

Here, same as before, $\phi 1 > 0$ means the phase of the light from phase-controlled element $21_1$ is ahead of $21_0$ along the direction γ, otherwise, means the phase of the light from phase-controlled element $21_1$ is behind of $21_0$ along the direction γ. So on for the rest.

The above phase relationship can also be rewritten as:

$$\phi 2 = \phi 1 \, d2/d1, \qquad (5.1)$$

$$\phi 3 = \phi 2 \, d3/d2, \qquad (5.2)$$

$$\phi 7 = \phi 6 \, d7/d6. \qquad (5.3)$$

Only when $\phi 1, \phi 2, \ldots, \phi 7$ are all equal to an integer (including zero) number of $2\pi$, the light from each phase-controlled element will be all in-phase in direction γ. In order to find out if it is possible to have the light from each phase-controlled element to be all in-phase in direction γ, now let's introduce the unknown coefficients n1, n2, ..., n7, and rewrite the above expressions in the following form:

$$\phi 1 = n1 \, 2\pi, \qquad (6.1)$$

$$\phi 2 = n2 \, 2\pi, \qquad (6.2)$$

$$\phi 7 = n7 \, 2\pi. \qquad (6.3)$$

The question that whether the light from each phase-controlled element are all in-phase becomes the question that whether n1, n2, ..., n7 can all be integer.

From (5.1), (6.1) and (6.2), we have:

$$n2 = n1 d2/d1, \qquad (7.1)$$

Similarly, $$n3 = n2 d3/d2, \qquad (7.2)$$

$$n7=n6 d7/d6. \quad (7.3)$$

Assuming for a γ, n1 is equal to an integer, from (7.1) to (7.3), it can be seen that unless d1, d2, . . . , d7 are equal to each other, or they have integer number of relationship with each other, n1, n2, . . . , n7 can not all be integer. The prior art phased-array is the regular array, where the phase-controlled elements is equally spaced. d1, d2, . . . , d7 are equal to each other:

$$d=d1=d2= \ldots =d7. \quad (8)$$

Therefore, $$\delta=\delta1=\delta2= \ldots =\delta7, \quad (9)$$

$$\alpha=\alpha1=\alpha2= \ldots =\alpha7, \quad (10)$$

$$\phi=\phi1=\phi2= \ldots =\phi7, \quad (11)$$

$$n=n1=n2= \ldots =n7. \quad (12)$$

Thus, we can have equation:

$$\sin \theta = \sin \gamma + n\lambda/d \quad (13)$$

Therefore, for a regular array, the question of whether the light from each phase-controlled element can all be in-phase becomes the question of whether there is in integer n to satisfy the above equation.

In the following, the discussion will be for the case of $0 \leq \theta < \pi/2$ (for the case of $-\pi/2 < \theta < 0$, the analysis is similar). In FIG. 2 and FIG. 3, if θ>0 corresponds to deflecting light up, then θ<0 corresponds to deflecting light down, and θ=0 means light beam points the boresight of the phased-array.

When $0 \leq \theta < \pi/2$, then $0 \leq \sin \theta < 1$, thus, $$0 < \sin \gamma + n\lambda/d < 1.$$

Rewriting it as the following, and call it the "main condition":

$$-n\lambda/d \leq \sin \gamma < 1 - n\lambda/d \quad (14)$$

As mentioned above, whether the light from each phase-controlled element can all be in-phase in direction γ can be determined by if n can be an integer. In the following, we analyze the possibility that n is an integer. For n=0, γ=θ. This is not consistent with the assumption that "the direction γ is different from direction θ. Therefore, the case of n=0 will not be considered. In the following, for d=2λ, d=λ, d=λ/2 three cases, we will discuss n±1, n±2, . . . , respectively.

Substituting d=2λ into (14):

$$-n/2 \leq \sin \gamma < 1-n/2 \quad (15)$$

Substituting all possible n values that can satisfy the above equation:

For n=1, (1.5) becomes:

$$-0.5 \leq \sin \gamma < 0.5 \quad (16)$$

From this, we know that the γ that satisfies (16) is within the range of $-\pi/6 \sim \pi/6$. For γ within this range, the sin θ is in range of 0~1. Therefore, when output beam from the phased-array is within the range of $0 \sim \pi/2$, there is a accompanying beam in the range of $-\pi/6 \sim \pi/6$.

For n=−1, (15) becomes:

$$0.5 \leq \sin \gamma < 1.5 \quad (17)$$

The γ that can satisfy this condition is in range of $\pi/6 \sim \pi/2$. The corresponding θ is in the range of $0 \sim \pi/6$.

For n=2, (15) becomes:

$$-1 \leq \sin \gamma < 0 \quad (18)$$

The γ that can satisfy this condition is in range of $-\pi/2 \sim 0$. The corresponding θ is in the range of $0 \sim \pi/2$.

For n=−2, (15) becomes:

$$1 \leq \sin \gamma < 2 \quad (19)$$

This condition can be satisfied only when γ=π/2, correspondingly, θ=0.

For n=3, (15) becomes:

$$-1.5 \leq \sin \gamma < -0.5 \quad (20)$$

The γ that can satisfy this condition is in range of $-\pi/2 \sim -\pi/6$. The corresponding θ is in the range of $\pi/6 \sim \pi/2$.

Other integer n can not satisfy (14). The results are summarize in following:

n=1, the range of γ: $-\pi/6 \sim \pi/6$, the range of θ: $0 \sim \pi/2$.

n=−1, the range of γ: $\pi/6 \sim \pi/2$, the range of θ: $0 \sim \pi/6$.

n=2, the range of γ: $-\pi/2 \sim 0$, the range of θ: $0 \sim \pi/2$.

n=3, the range of γ: $-\pi/2 \sim -\pi/6$, the range of θ: $\pi/6 \sim \pi/2$.

Therefore, when θ is in the range of $0 \sim \pi/6$, there are three accompanying beams. When θ is in the range of $\pi/6 \sim \pi/2$, there are also three accompanying beams. When θ=0, there are two accompanying beams. When θ=π/6, there are also two accompanying beams. (In the above, the cases of γ=π/2 or −π/2 are not taken into account. The same will be for the followings).

Substituting d=λ into (14):

$$-n \leq \sin \lambda < 1-n \quad (21)$$

Substituting all possible n values into the condition as in the case of d=2λ. The results are: Only when n=1, there is an accompanying beam. The range of the γ is $-\pi/2 \sim 0$; the range of θ is $0 \sim \pi/2$. When θ=0, the corresponding γ is π/2 and −π/2, and there is just no accompanying beam.

Substituting d=λ/2 into (14):

$$-2n \leq \sin \gamma < 1-2n \quad (22)$$

No matter what integer value of the n is, there is no γ that can satisfy this condition. Therefore, there is no accompanying beam, no matter what range the θ is. However, when θ=π/2, we have n=1, and correspondingly, γ=−π/2. The accompanying beam is just about to occur, but just have not occurred yet. It can be deduced tllat when d>λ/2, there will be accompanying beam.

In above, we have calculated d=2λ, λ, λ/2 three cases. The rule for the occurrence of the accompanying beams is that: the larger the d, the more the accompanying beams; when d is less than λ/2, there is no accompanying beam.

In practical application, the scanning angular range is often much smaller than π/2. At that time, the maximum d can be larger than λ/2 without introducing an accompanying beam. For example:

From (13), take n=1, γ=−π/2 (i.e. the accompanying beam is about to occur but have not occurred yet), for difference scanning angular range, the maximum d is determined as followings:

When θ=−30°~30°, d=0.67λ,

When θ=−10°~10°, d=0.85λ,

When θ=−5°~5°, d=0.92λ.

When θ=−1°~1°, d=0.98λ.

The above analysis has explained why prior arts require to place the phase-controlled elements in a spacing less than half wavelength or less than one wavelength. If the distance between phase-controlled element is less than the wavelength, then, the dimension of the phased-controlled element itself must be smaller than the wavelength.

In practical application, the maximum d without accompanying beam can be even larger. For example, if limiting the light from each phase-controlled element in the angular range corresponding to the angular range of the scanning of the beam from the phased-array, then, beyond this angular range, even if the condition for accompanying is satisfied, there will still be no accompanying beam. The maximum d can be estimated as following:

From (13), take n=1, γ=−θ(i.e. the accompanying beam is about to occur but has not occurred yet), for different scanning angular range, the maximum d can be determined. Some examples are listed below:

When θ=−30°~30°, d=λ,
When θ=−10°~10°, d=2.8λ,
When θ=−5°~5°, d=5.7λ,
When θ=−1°~1°, d=28λ.

In summary, for prior art, there is always a restriction in the distance between the phase-controlled elements by the wavelength. When the distance between the phase-controlled elements is larger than the wavelength, the scanning angular range decreases rapidly as the distance is enlarged.

U.S. Pat. No. 5,093,740 (issued on Mar. 3, 1992) by Dorschner etc. described a liquid-crystal based array of longitudinal phase-modulators, as shown in FIG. 1. This patent also described a sub-array method to reduce the control lines. But this patented technology limited the scanning angle to some special, discrete values. Furthermore, even if the sub-array method is used, its number of control line is still a large number. Therefore, that device does not have much significance in practical application.

Before describing the principle and method of the present invention, let's briefly describe the sub-array method of prior art. Referring now to FIG. 1. The strip electrodes are grouped, and each group becomes a sub-array. Each sub-array has plurality of phase-modulators. For each phase-modulator at the corresponding position in each sub-array, its control electrode is connected in parallel, and is controlled in parallel by the controller. FIG. 4 describes the phase relationship among the phase-controlled elements in each sub-array and among the sub-arrays. The figure illustrates three adjacent sub-arrays: $30_1$, $30_2$ and $30_3$. In FIG. 4, the horizontal axis represents the geometric position of each phase-modulator, and the stair-like line represents the phase of each phase-modulator. Since in each sub-array, the phase-modulator of the corresponding position is controlled in parallel, the shape of the stair-like line 22 is identical for the three sub-arrays. That is to say that within each sub-array, the light in the given direction is all in-phase. However, the light among the sub-arrays is not necessary to be in-phase in the given direction. The mis-match of the phase among sub-arrays can be illustrated with phase relationship at the boundary between two adjacent sub-arrays, as shown in FIG. 4. In FIG. 4, on the boundary $I_{1,2}$ of two adjacent sub-arrays $30_1$ and $30_2$, the stair-like line 22 have a phase difference β. In general, β is not equal to zero or 2π. On the boundary $I_{2,3}$, the situation is similar. Therefore, for the prior art, only when the beam of the light is in some special directions such that the β is happen to be equal to zero or 2π, the light from each sub-array will become in-phase with each other. In all other directions, β is not equal to zero or 2π, the phase of the light from each sub-array does not match with each other, and the phased-array can not work. Therefore, the sub-array technique proposed by Dorschner etc. can only deflect beam to some special discrete angles. This obviously affects its practical applications.

James A. Thomas, Mark Lasher etc. used the cascade of two scanner to solve the problem of phase mis-match among sub-array, referring to "Optical Scanning Systems: Design and Applications", Leo Beiser and Stephen F. Sagan, Ed., Proc. SPIE 31, pp.124–132(1997). However, they still did not overcome the problems caused by the limitation of wavelength on the size of phase-controlled element and on the spacing between the phase-controlled elements. These problems include: Scanning angular range is extremely small, and number of scanning lines is less than the number of rows of the phase-controlled elements.

SUMMARY OF THE INVENTION

The present invention provides an optical phased-array device. The said device consists of plurality of phase-controlled elements that form an irregular phased-array, and means to control the phase relationship among the light from each phase-controlled element such that to deflect a beam of light in a given direction; the effective position of the phase-controlled elements form an irregular pattern, and the average distance between the adjacent phase-controlled elements is substantially larger than the wavelength of the light.

An optical phased-array device according to the present invention, wherein irregular phased-array consists of plurality of sub-arrays which consists of plurality of phase-controlled elements; the effective positions of the phase-controlled elements of the sub-array form irregular pattern, and the effective array of the sub-arrays are also irregularly arranged with respective to each other.

The present invention also provides method to control sub-arrays, which includes parallel controlling of the sub-arrays and independent controlling of each sub-array. Sub-array controlling method also includes additional phase-modulator for sub-array phase compensation.

An optical phased-array device according to the present invention also includes the array of lenses or mirrors, which are coupled with the phase-modulators; whereby, forming virtual array of point source of light.

BRIEF DESCRIPTION OF THE DRAWINGS

FIG. 13 is a two-dimensional array of longitudinal phase-modulators, wherein each modulator can be independently controlled.

DETAILED DESCRIPITION OF THE INVENTION

1. The Principle of the Irregular Phased-array

Figure 2:
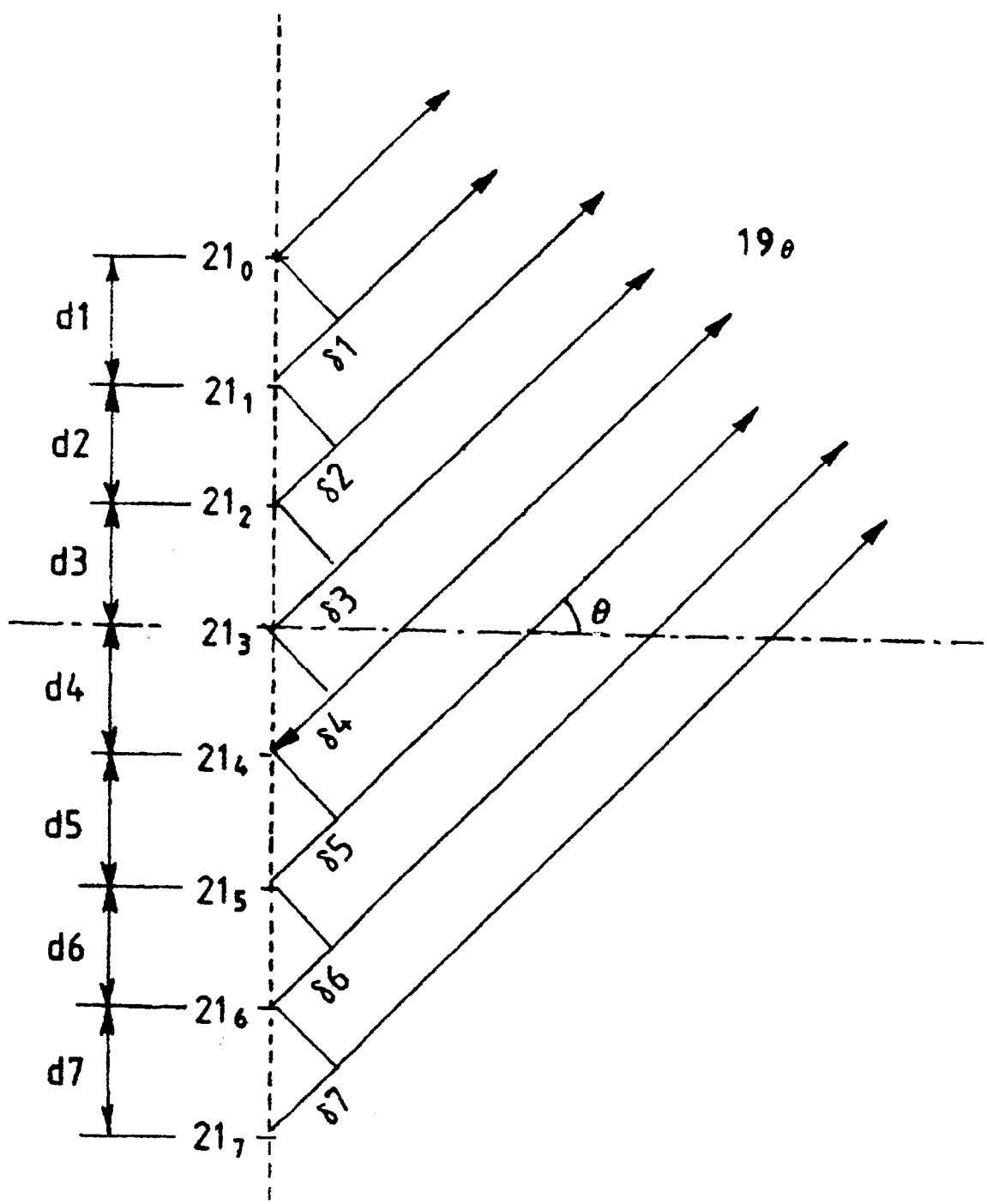
FIG. 2 is the schematic for illustrating the principle that phased-array technology generates a beam in θ direction.
Figure 3:
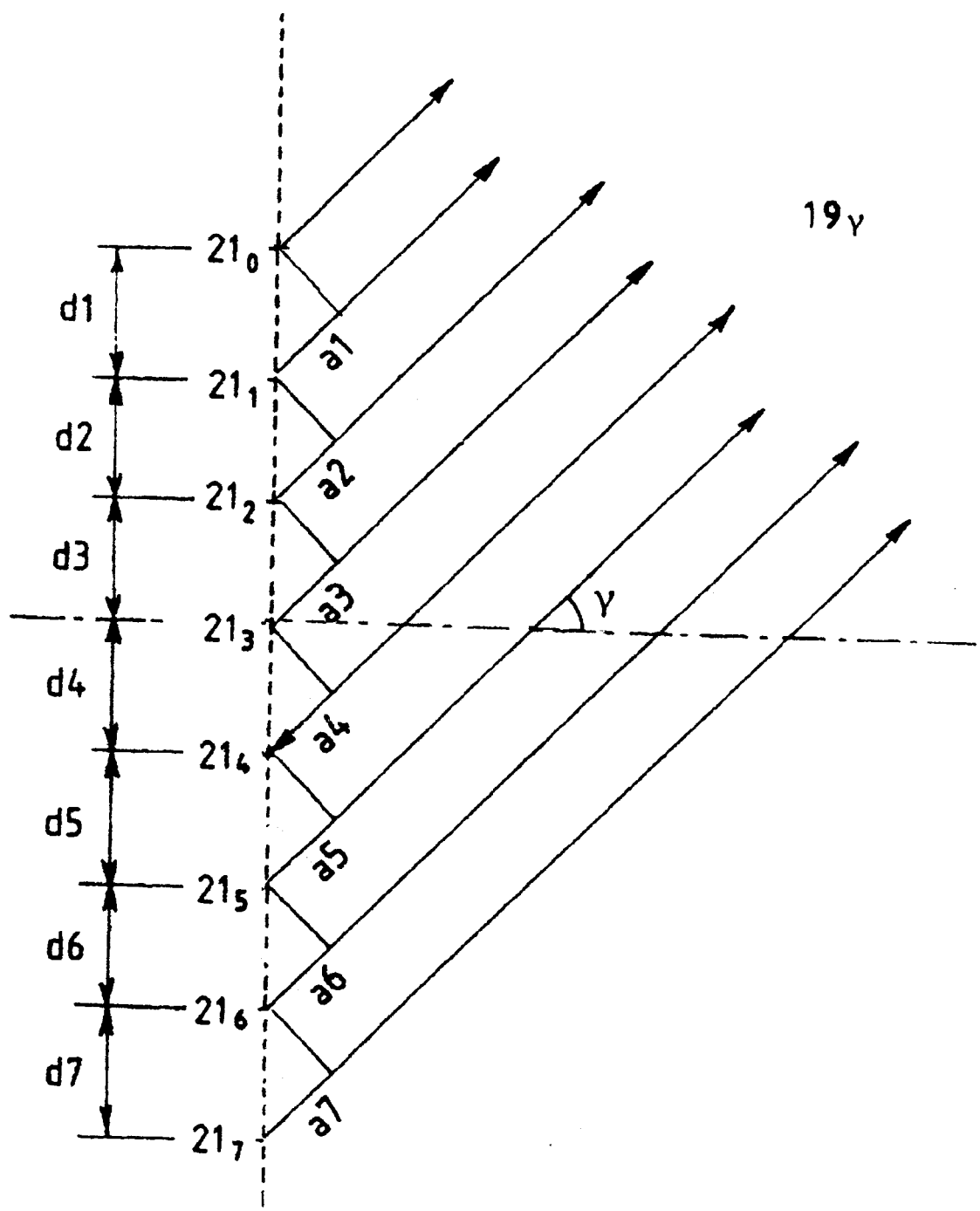
FIG. 3 is for the explanation of multiple beam phenomenon in the phased-array technology.

For the prior art optical phased-array, the phase-controlled elements form a regular pattern, i.e. $d1=d2= \ldots =d7$ (referring to FIG. 2), while, for the present invention, the phase-controlled elements form an irregular pattern. Generally, the distances between the adjacent phase-controlled elements are not equal to each other, and there is also no integer relationship or other special relationship among them. Therefore, in the expression (7.1) to (7.3), n1, n2, ..., n7 can not all be integer at same time. That is to say: no matter what ratio of $d/\lambda$ is, there is always no accompanying beam. In an irregular phased-array, the rule of the placing the phase-controlled element can be stated as:

The distance between the phase-controlled elements is a random variable, which follows a certain distribution within a certain range, for example, a uniformly distributed random variable within a certain range. For example, the distance between phase-controlled elements assumes a value within 0–2d with equal probability. Thus, the average distance between the phase-controlled elements will be the d. When there is enough number of the phase-controlled elements (e.g. over thousand), the intensity of the radiation from the phased-array in the directions other than the beam is negligibly small in relative to the intensity of the beam. In the following, the principle of the irregular phased-array will be further explained with some examples of the embodiment.

Because the phased-array of the present invention is an irregular array, there is no accompanying beam problem when the d is larger than the wavelength of the light. In designing the irregular phased-array, the width of the phase-modulator or the center-to-center distance of two adjacent phase-modulators can assume a much larger value than the wavelength of the light; it can be tens of times to thousands of times of the wavelength, or even larger. This is a significant advantage of the irregular phased-array.

2. Array of Lenses and Virtual Array of Effective Point-source of Light

Figure 5:
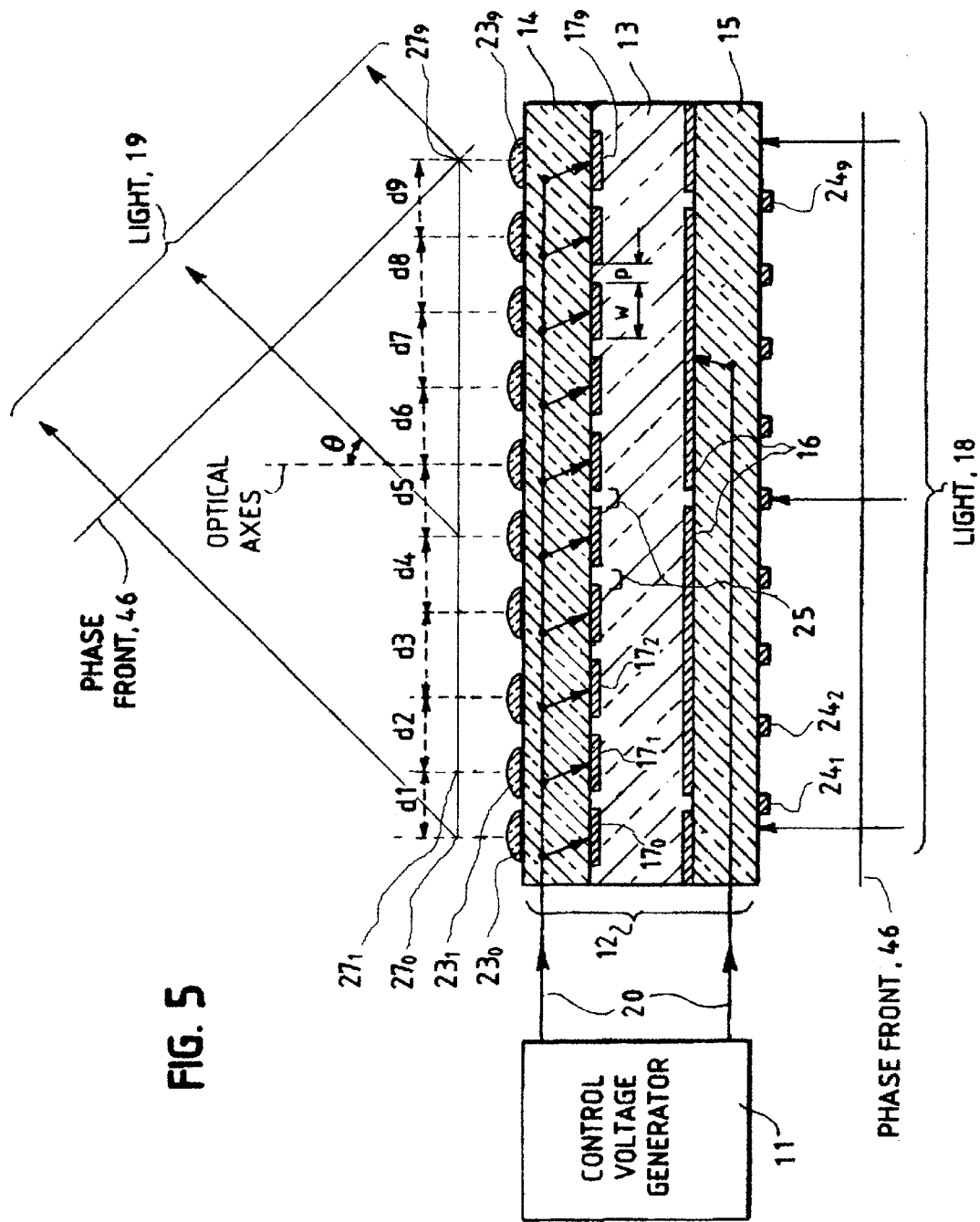
FIG. 5 is the cross-section view of some phase-controlled elements of one type of embodiment of the irregular phased-array.

FIG. 5 is a part of the cross-section view of an embodiment of the irregular phased-array. This device includes controller 11 and phase-modulator array 12, and array of lenses $23_0, 23_1, \ldots$, collectively referred as 23. The array of lenses is a distinguish feature of the present invention. The $27_0, 27_1, \ldots$ are the focal points of the lenses, collectively referred as 27. The d1, d2, ..., are the distance between the focal points of the adjacent lenses. The phase modulator consists of mainly the control electrode 17, the common electrode 16 and the electro-optical material 13 between the two electrodes. Plurality of phase-modulator form an array of phase-modulator 12. In the irregular phased-array, the phase-modulator and the lens 23 coupled with the phase-modulator form a phase-controlled element. Plurality of the phase-controlled elements form an irregular phased-array. Or in other words, it can be regarded that the irregular phased-array is formed with an array of phase-modulators and an array of lenses. The phased-array, controller and control lines form a phased-array device. Controller 11 controls the phase of the light from each phase-controlled element to make light from each phase-controlled element all in-phase in a given direction. Thus, the phased-array produces a beam of light 19 in the given direction, e.g. the θ. This beam can also be focused with a lens to a surface (e.g. a screen).

Figure 1:
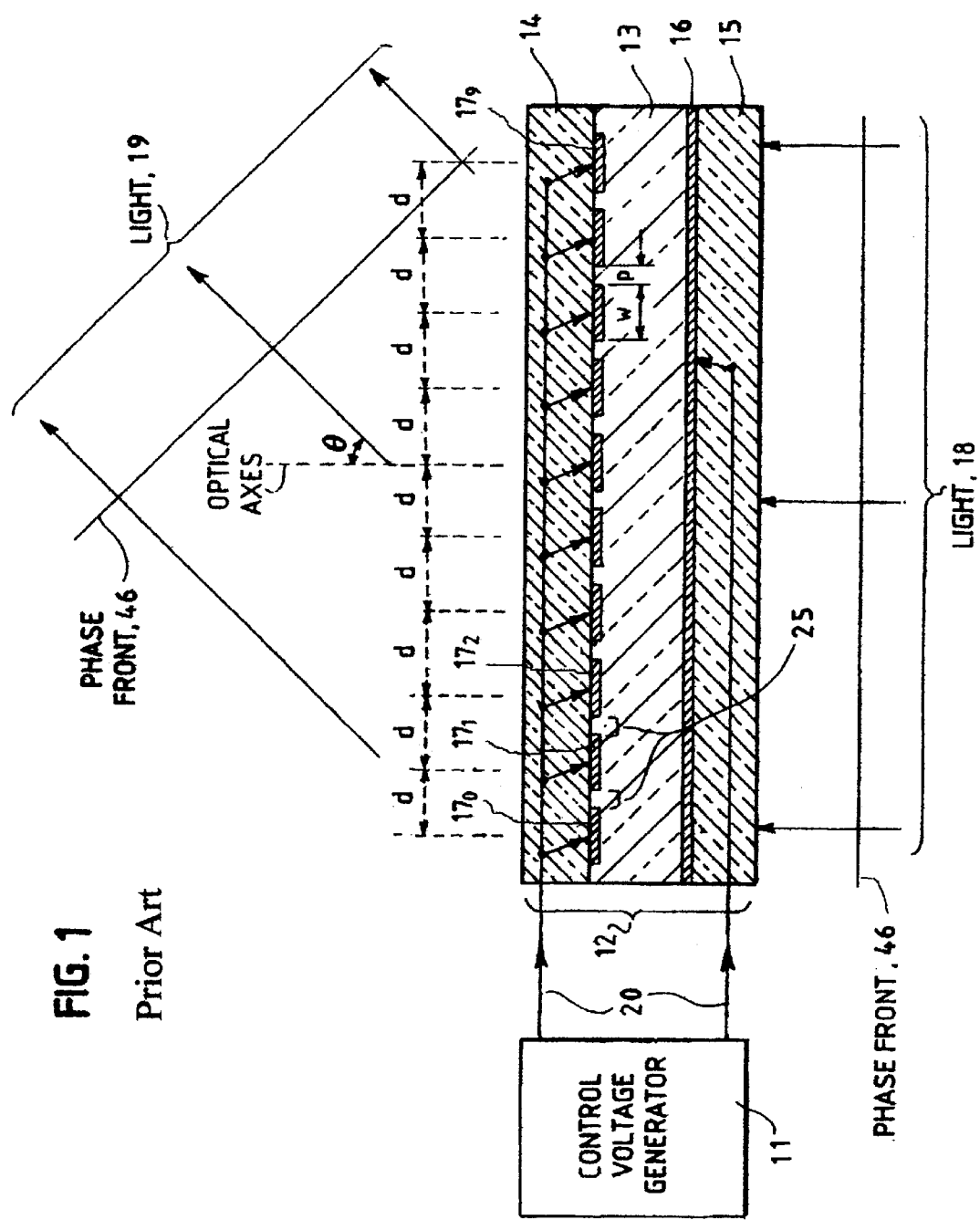
FIG. 1 is the cross-section view of a prior art regular phased-array device.

In FIG. 5, the 46 represents the wave front, the 18 is the incident light. Light shielding strip 24 is the collection of the individual light shielding strip $24_1 \sim 24_9$. The light shielding strip is non-transparent, and is used to lock the light from entering the space 25 between the phase-modulators. The difference between the FIG. 5 and FIG. 1, besides the array of lenses, is also on that in the FIG. 5, the common electrode 16 forms plurality of mutually independent electrodes according to the division of the sub-arrays. Each sub-array has a common electrode 9 that is independent of other sub-arrays (details in the text bellow). Furthermore, in FIG. 5, the width w of the control electrode 17 is much larger than the wavelength of the light, for example, it can be tens of times to thousands of times of the wave length of the light, or even larger. Such large width is impossible for the prior arts.

The common electrode 16 and the control electrode 17 in the FIG. 5 can exchange their position, i.e. placing the 16 at the side of light output and placing 17 at the side of light incident, the results is the same.

In FIG. 5, ten phase-controlled elements are illustrated. In practical application, the irregular phased-array usually contains large number (e.g. over a thousand) of phase-controlled element. The phase-modulator can also be constructed with a wave duct (e.g. optical fiber). At this time, the phase-modulator consists of a wave duct of certain length, which is made of electro-optical material and has electrodes on it.

In the irregular phased-array, besides the liquid-crystal, there are many other electro-optical material that can be used, including: $LiNbO_3$, $TiTaO_3$, BBO, KDB, KDP, BSO, BGO, KTP, $KNbO_3$, $LiIO_3$, ZnSe, and polymers. There are many this type of material, and we are not going to mention all of them here.

What FIG. 5 illustrated is only one particular embodiment of the present invention. The present invention is not limited to be that particular embodiment. Furthermore, the lens that forms the array of lenses can be convex lens, concave lens or diffractive lens etc. In the case of convex lens, the light is focused to the focal point, and then diverges from the focal point. In the case of concave lens, the light diverges as if from the virtual focal point. The lens can also be a cylindrical lens for one-dimensional scanning application. Similar to the focal point of a spherical lens, the cylindrical lens has focal line (for the simplicity, it will still be called as focal point). By choosing the optical parameter of the lens such as aperture, focal length, a proper divergent angle of the light can be obtained. The diverge angle should match with the deflection angular range of the phased-array. If the divergent angle is too small, it will not satisfy the need in the entire deflection angular range. If the divergent angle is too large, it will waste the light, and lower the efficiency of the system.

In this writing, it is assumed that the incident beam of light is parallel to the optical axes of the lens when the action of the lens is described, unless otherwise stated. If the incident beam of light is not parallel to the optical axes of the lens, the beam will be focused to some where on the focal plane instead of on the focal point. But, there is no essential difference for what we are concerned here.

A lens is coupled with a phase-modulator, to focus the light from the phase-modulator (using convex lens as example. Same for the rest of the text), and then diverges the light from the focal point with a certain divergent angle. Here, one phase-controlled element includes one phase-modulator and one lens coupled with the phase-modulator.

The location of the periphery of the lens corresponds to the location of the periphery of the phase-modulator. The center determined based on the periphery of the lens is called the geometric center of the lens. The center determined based on the periphery of the phase-modulator is called the geometric center of the phase-modulator. The geometric center of the phase-modulator usually coincides with the geometric center of the lens, and usually collectively referred as geometric center of the phase-controlled element. The center-to-center distance between adjacent phase-modulators is the distance between the geometric centers of the adjacent phase-modulators, and is simply called as distance between the phase-controlled elements.

After having adapted the lens, the light from each phase-controlled element of the phased-array appears to be emitted as if from a point-source at the focal point of the lens, furthermore, it is a phase-controllable point-source of light. Of course, it is not a real point-source of light, therefore, is called effective point-source of light.

As viewed from the boresight of the phased-array, the optical axes (and the focal point on the optical axes) usually does not coincided with the geometric center of the lens (and the geometric center of the phase-modulator). When determining the phase relationship among the light from each phase-controlled element, what is concerned is the position of the focal point of the lens, while the geometric position of the lens is no longer directly relevant any more. Therefore, the position of the focal point of the lens is defined to be the effective position of the phase-controlled element. Correspondingly, the irregular distance between the phase-controlled elements in the irregular phased-array is the distance between the effective positions of the phase-controlled elements.

Thus, in fact, it produces an virtual array wherein the effective position of the phase-controlled element follows an irregular pattern. In other words, the virtual array is the array of the effective position of the phase-controlled element. It is called virtual array of effective point-source of light, after the light source has been included. The above method of defining the effective position of the phase-controlled element and producing the virtual array of the effective point source of light can be used for both irregular phased-array and regular phased-array.

Using the lens and introducing the concepts of effective position of the phase-controlled element and virtual array of effective point-source of light make the design and fabrication of the optical phased-array device easier, and make a practically useful optical phased-array possible.

It needs to be pointed out that such phased-array based on virtual array of effective point source of light can also be realized with mirrors (detailed description later).

Figure 6:
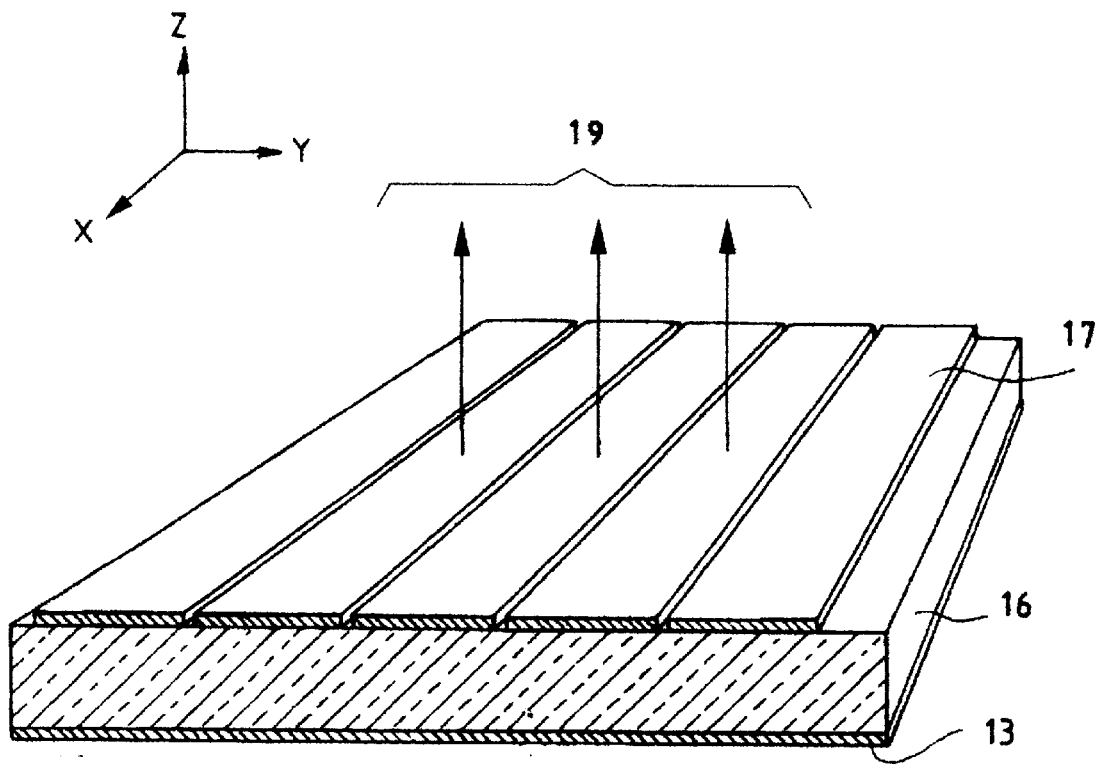
FIG. 6 illustrates the array of longitudinal phase-modulators based on -solid electro-optical material.
Figure 7:
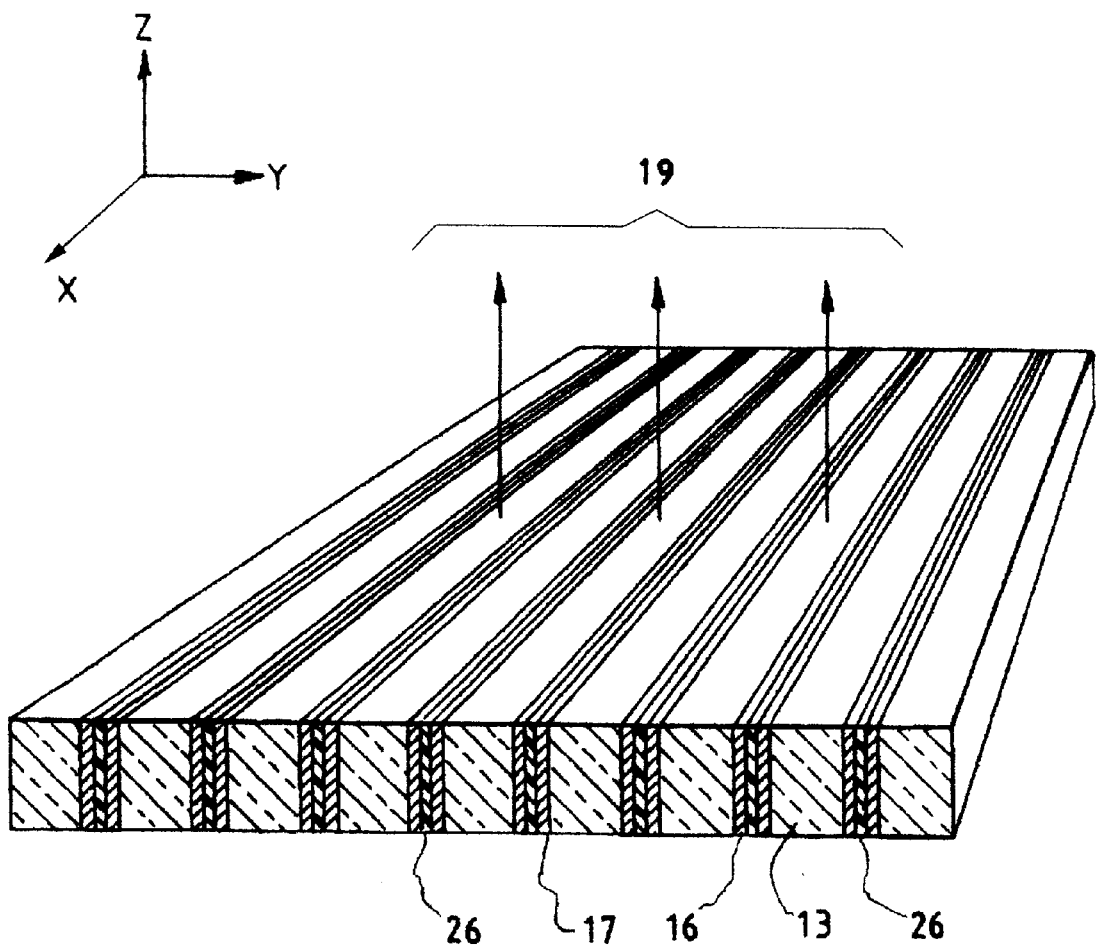
FIG. 7 illustrates the array of transverse phase-modulators based on solid electro-optical material.

FIG. 6 and FIG. 7 illustrate the array of one-dimensional phase-modulators that are constructed with solid electro-optical material 13. Though the solid electro-optical material usually has weak electro-optical effect than that of liquid-crystal, the response speed is much faster. Thus, when the beam changes its direction of the deflection, the switching speed can be as high as $10^{-12}$ second. Due to the usage of the solid electro-optical material, in FIG. 6 and FIG. 7, there are no front window 14 and rear window 15 of FIG. 5. This is because that the solid electro-optical material can maintain its own shape. As shown in FIG. 6, in the phase-modulator, the electric field direction Z is parallel to the direction of light propagation 19, therefore, this is a longitudinal phase-modulator. The transparent control electrode 17 and common electrode 16 are directly attached to the electro-optical material 13. In the transverse phase-modulator, as shown in FIG. 7, the electric field direction y is perpendicular to the direction of light propagation 19; the phase-modulator is consists of electro-optical material 13 and the electrodes 17 and 16 on the two side of the electro-optical material respectively. The phase-modulators are stacked together with insulator layer 26 between them. The structure shown in FIG. 6 and FIG. 7 coupled with the array of lenses can be used to construct the irregular phased-array.

Figure 8:
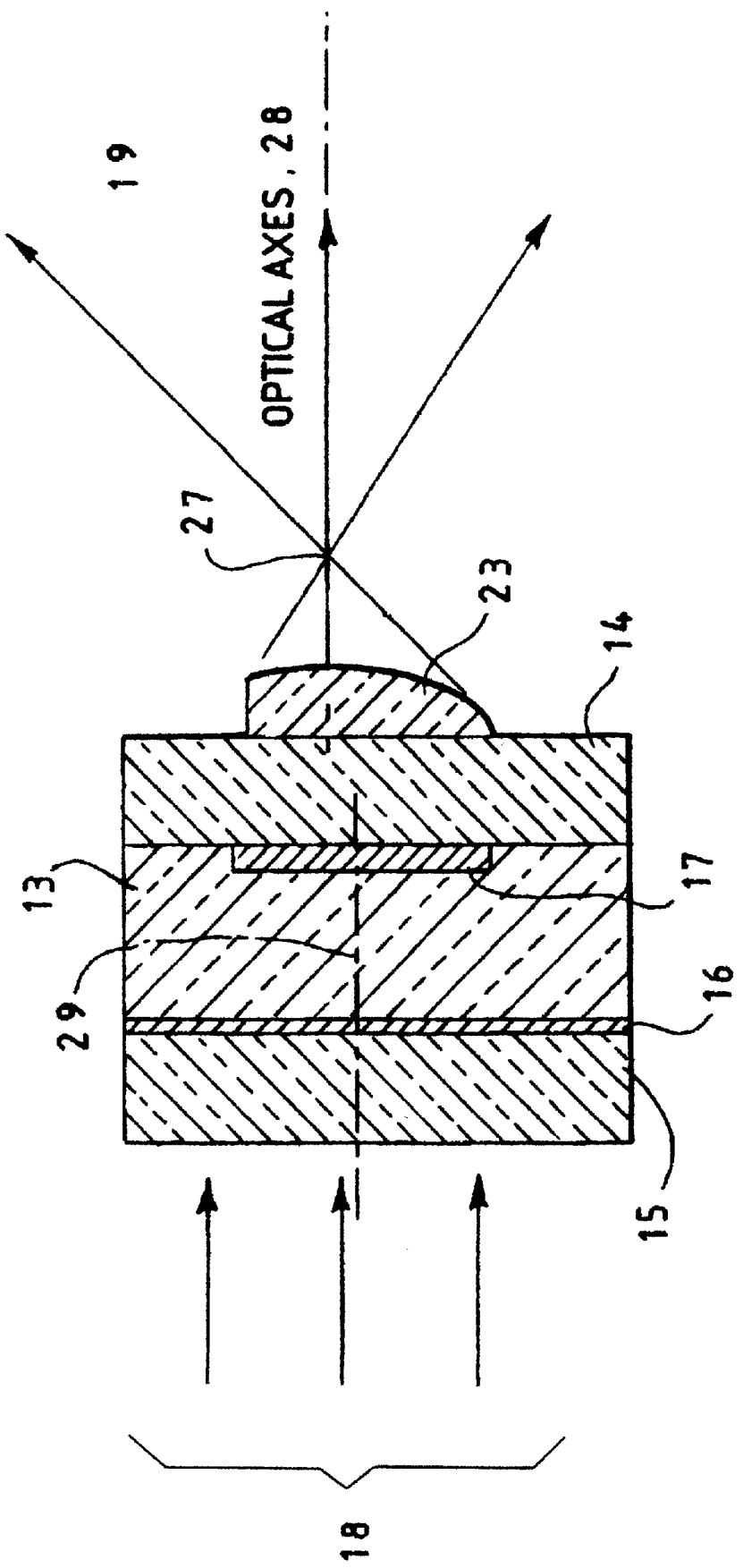
FIG. 8 illustrates a single phase-modulator and the corresponding lens for the irregular phased-array.
Figure 9:
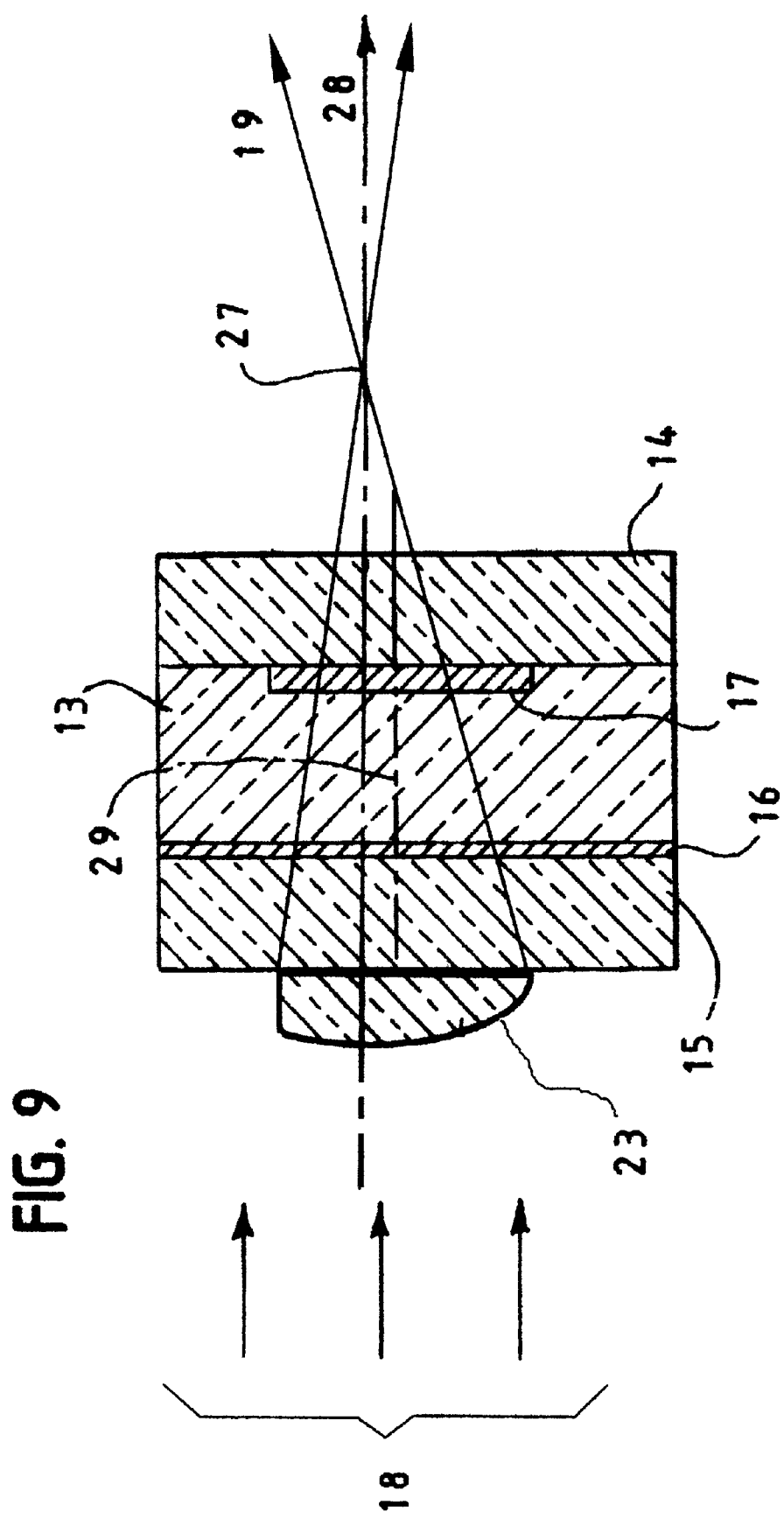
FIG. 9 is another arrangement for the lens.

FIG. 8 is an example of a phase-modulator with the lens 23 for the phased-array. The lens has a focal point 27. It can be seen from the FIG. 8 that the focal point is on the optical axis but is not necessary on the geometric center 29 of the lens or the phase-modulator. The difference between the geometric center and the optical axes can be seen from the FIG. 8. Just as purposely illustrated in FIG. 8, the lens can be, and usually is, asymmetrical. The focal point 27 of the lens is the effective position of the phase-controlled element of the irregular phased-array. The major feature of the irregular phased-array is that the effective positions of the phase-controlled element form an irregular pattern. The lens can also be placed at other side of the phase-modulator, as shown in FIG. 9.

3. Two-dimensional Irregular Phased-array

What is illustrated in FIG. 5 is a one-dimensional phased-array, which consists of a one-dimensional array of phase-modulators and a one-dimensional array of lenses. The lens can be a cylindrical lens, and the focal line of each cylindrical lens is usually on the same plane. A one-dimensional phased-array can deflect beam of light along one direction, i.e. it can do line scanning. If we need to scan the beam of light along two directions, i.e. scanning over a surface, we need a two-dimensional phased-array. For a two-dimensional phased-array, both the array of phase-modulators and the array of lenses are two-dimensional array.

In the following, we will describe several examples of the structure of two-dimensional array of phase-modulators.

Figure 10:
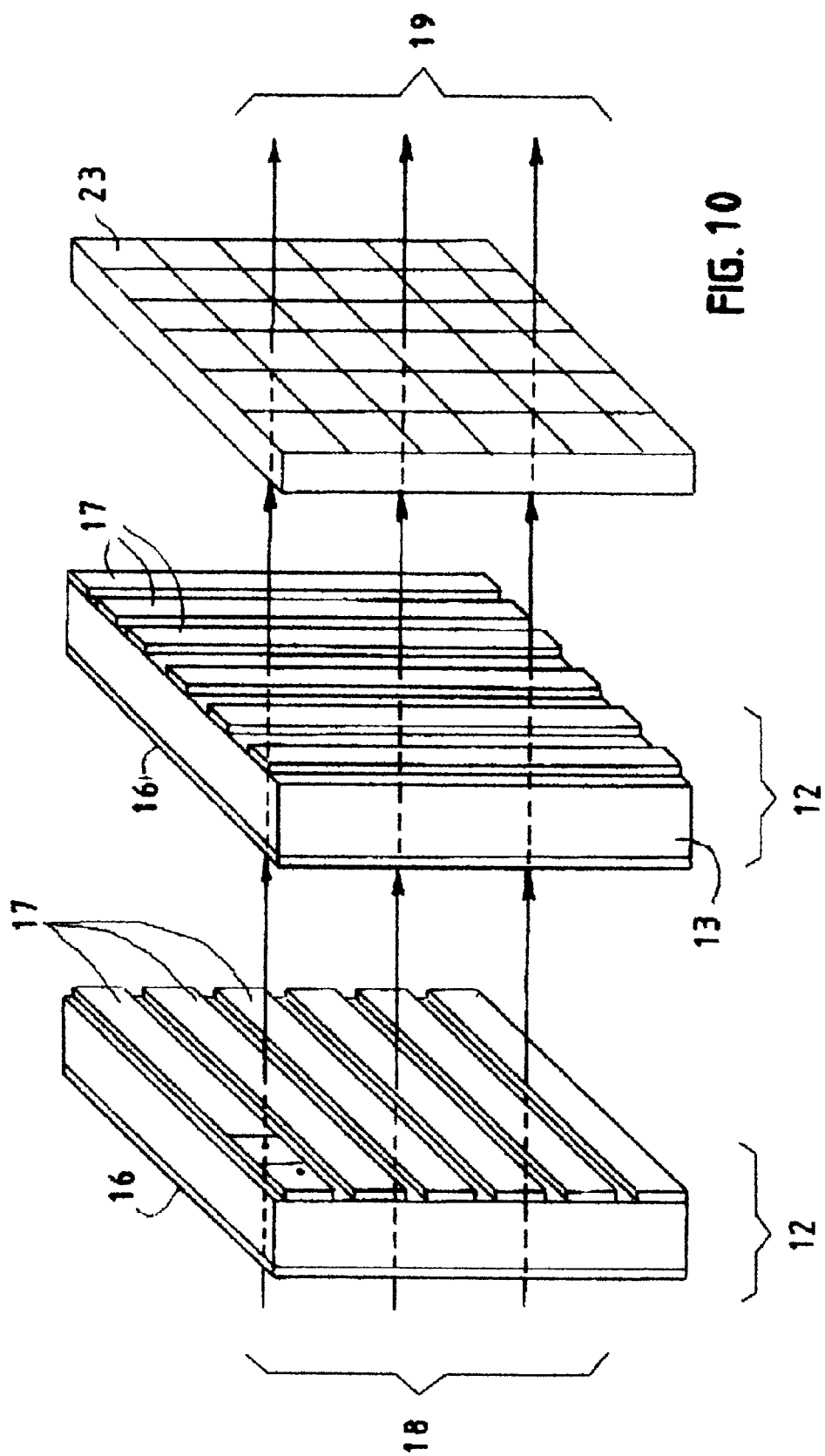
FIG. 10 is a two-dimensional phased-array formed by two one-dimensional arrays of phase-modulators and a two dimensional array of lenses.

FIG. 10 illustrates two one-dimensional arrays 12 of longitudinal phase-modulators. The strip electrodes of the two arrays of phase-modulators are perpendicular to each other. The two one-dimensional arrays are cross cascaded to form a two-dimensional array of phase-modulators, then, they are coupled with a two-dimensional array of lenses 23 to eventually form a two-dimensional phased-array. Where each phase-modulator in the two-dimensional array of the phase-modulators is formed by the superimposed portion of two one-dimensional (stripe) phase-modulators in the direction of light propagation. One of the two one-dimensional arrays of phase-modulators deflects the beam of light in the first dimension, and the another one-dimensional array of phase-modulators deflects the beam of light in the second dimension. The two groups of control signal for controlling the beam to deflect in the two directions are applied to the two one-dimensional arrays of phase-modulators respectively. Of course, similarly, we can also use two one-dimensional arrays of transverse phase-modulators to construct the two-dimensional array of phase-modulators. When the one-dimensional array of phase-modulators contains sub-array, the two-dimensional array of phase-modulators formed in this way will naturally contain two-dimensional sub-arrays (details in the following text).

Figure 11:
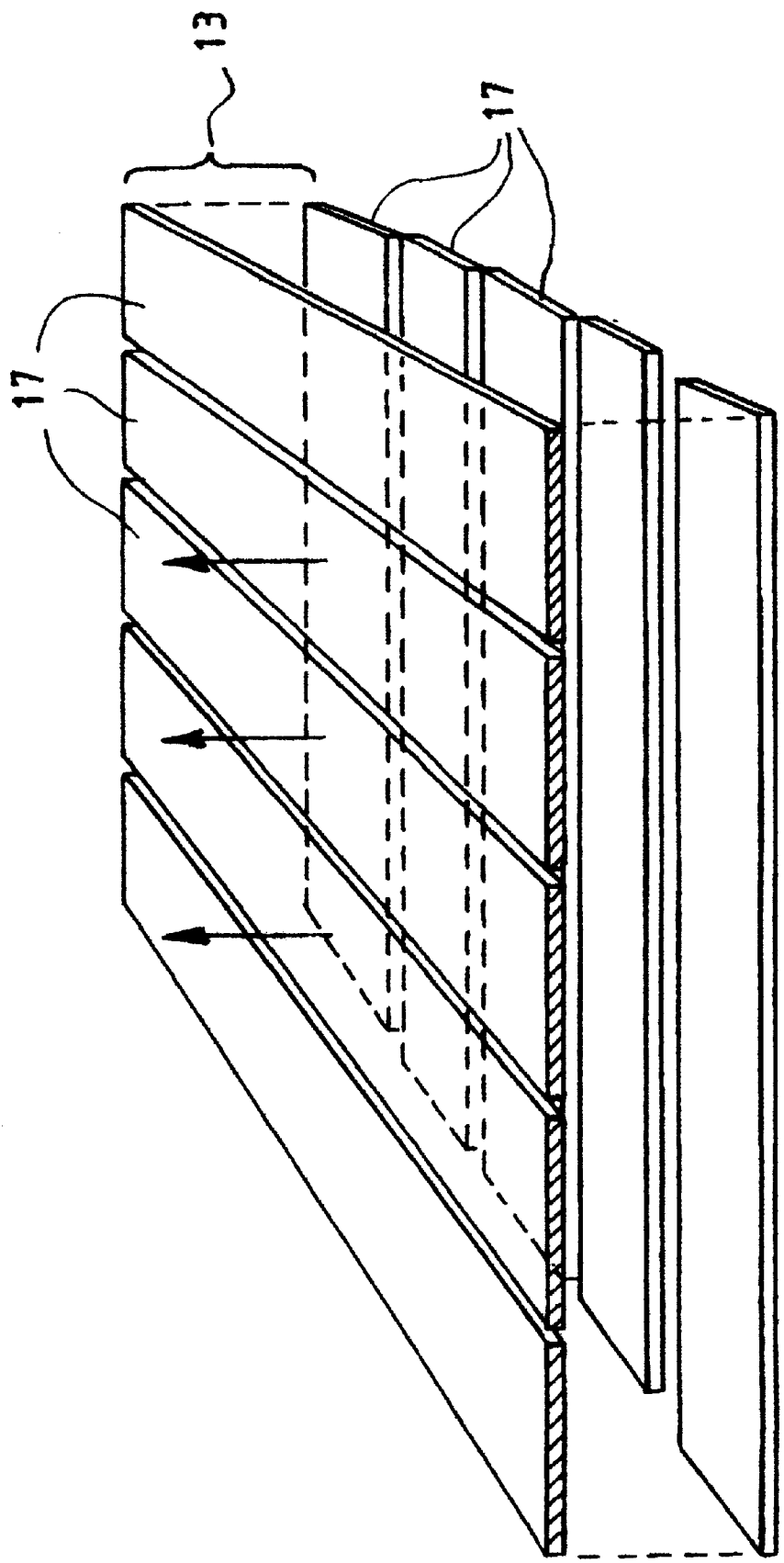
FIG. 11 illustrates how to construct a two-dimensional array of phase-modulators with two groups of electrodes.

FIG. 11 illustrates another way to construct a two-dimensional array of phase-modulators. Two groups of strip electrodes 17 that are perpendicular to each other are placed to the two sides of the electro-optical material 13 to form a two-dimensional array of phase-modulators. Each phase-modulator in this two-dimensional array of phase-modulators is formed by the two strip electrodes and the electro-optical material between the two electrodes. With a two-dimensional array of lenses, a two-dimensional phased-array is constructed. The two groups of control lines connect to the two groups of electrodes respectively to control the beam of light to have two-dimensional deflection. The two-dimensional array of phase-modulators in FIG. 11 is essentially same with the two-dimensional array of phase-modulators in FIG. 10, but the structure of the two-dimensional array phase-modulators in FIG. 11 is more compact. For FIG. 11 and FIG. 10, the characteristics of the control signals that are send to the two groups of electrodes are the same, except that the polarity of the two groups of signals are opposite to each other in FIG. 11. Of course, a non-zero electric potential can also be used as reference potential for these two groups of control signals.

Obviously, each phase-modulator in the two-dimensional array of phase-modulators shown in FIG. 10 or FIG. 11 is not controlled completely independent, since the controller sends control signal to the two groups of the strip electrodes rather than to each individual phase-modulator independently. The advantage of the structure shown in FIG. 10 and FIG. 11 is that the control signals for the two directions (two dimensions) are independent with each other, thus, the number of control lines are significantly reduced. Since each of the two groups of the control signal for the two-dimensional array of phase-modulators needs a maximum phase shift of one wavelength ($2\pi$), the maximum phase shift needed for each phase-modulator in the two-dimensional array of phase-modulators corresponds to two wavelength, i.e. $4\pi$.

Another scheme of the two-dimensional array of phase-modulator is different from the scheme of strip electrodes as shown in FIG. 10 or FIG. 11, it sends signal to each phase-modulator separately, and makes independent control of each phase-modulator. If using this scheme, each phase-modulator needs maximum phase shift $2\pi$ only, and the beam of light can be focused in three-dimensional space.

Figure 12:
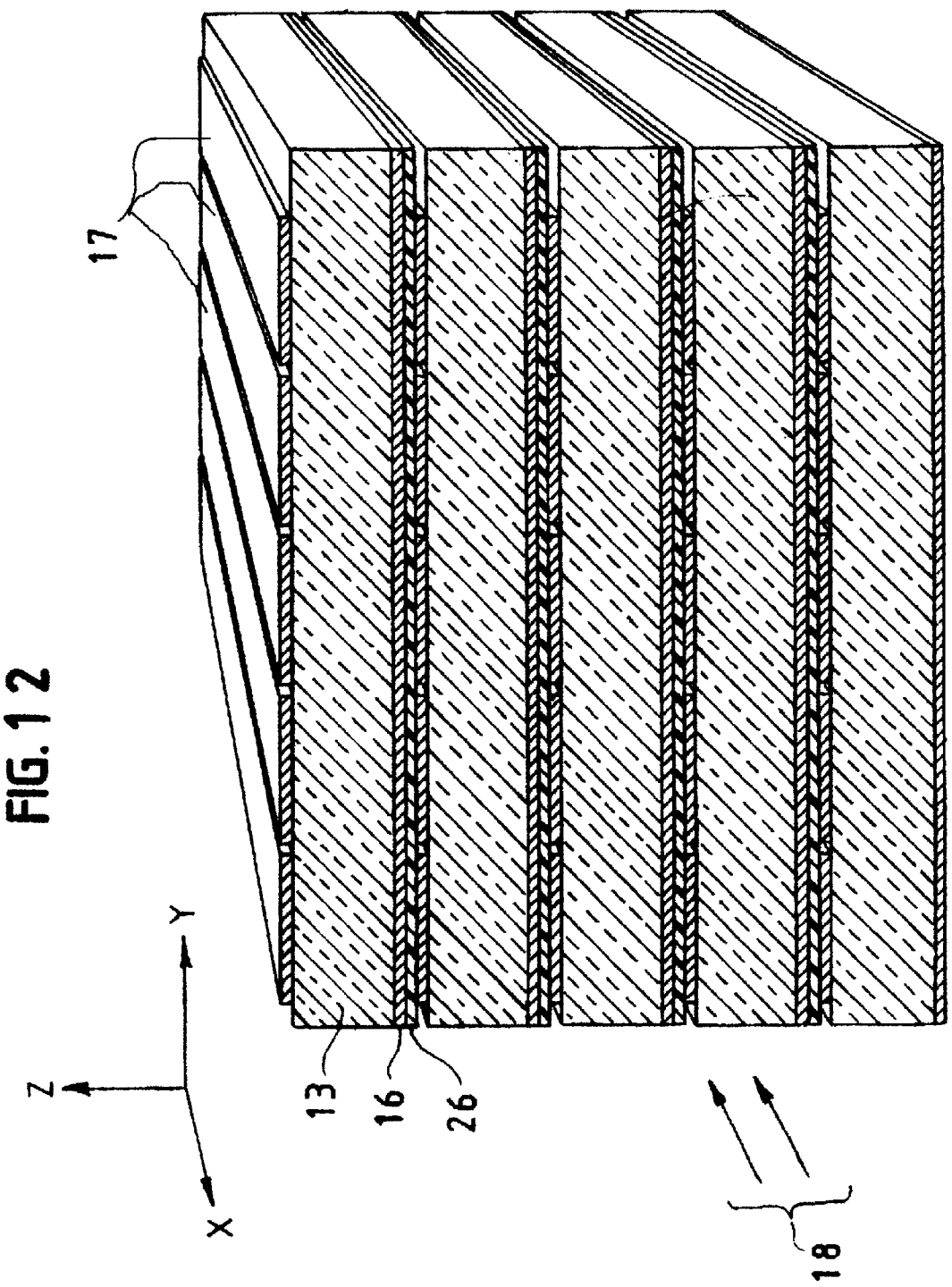
FIG. 12 is a two-dimensional array of transverse phase-modulators, wherein each modulator can be independently controlled.
Figure 14:
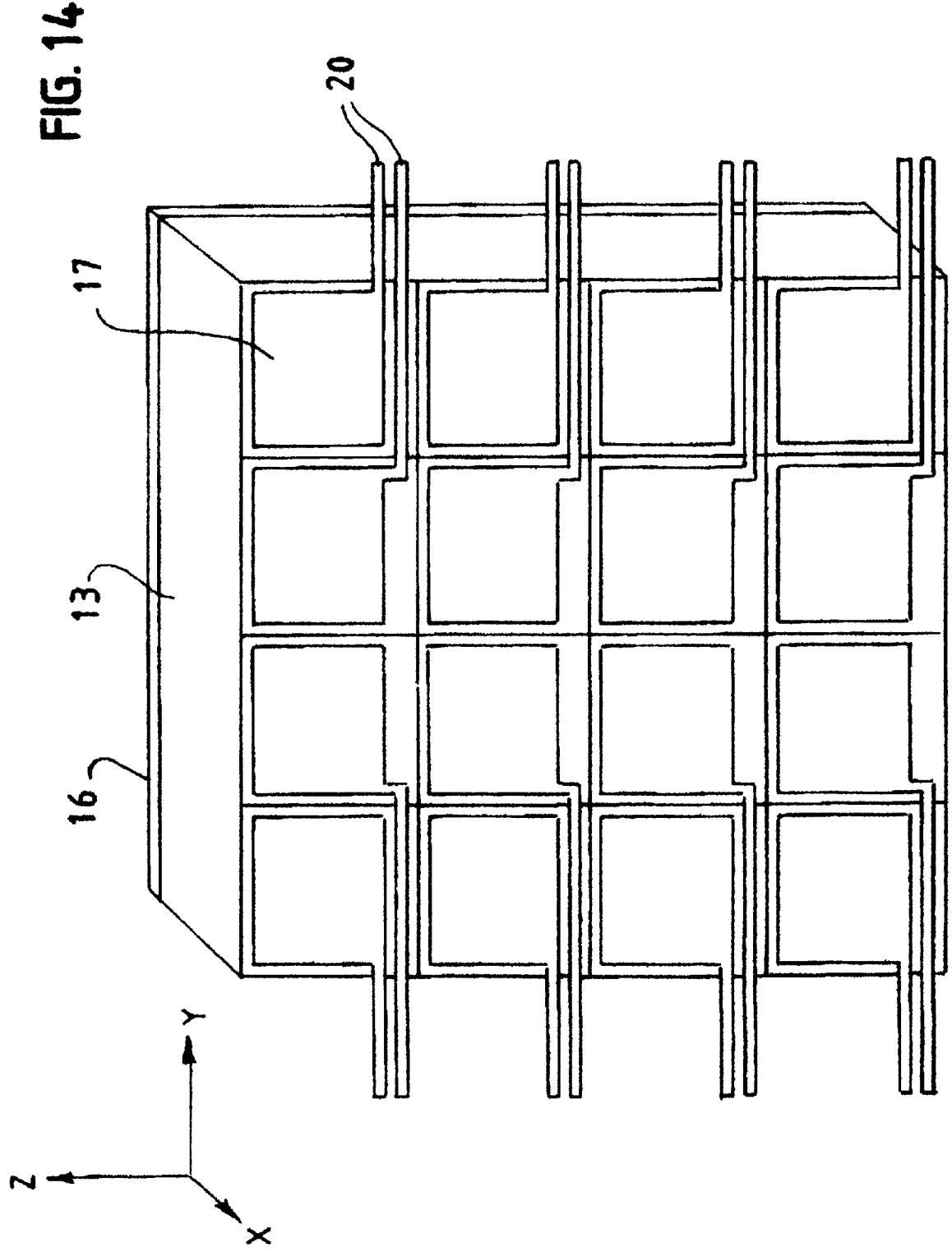
FIG. 14 is another type of two-dimensional array of longitudinal phase-modulators, wherein each modulator can be independently controlled.

FIGS. 12, 13, and 14 illustrate the two-dimensional array of phase-modulators in which each phase-modulator can be independently controlled, then, coupled with the array of lenses, a two-dimensional phased-array is constructed.

FIG. 12 illustrates a two-dimensional array of phase-modulators with transverse phase-modulator. The incident light 18 comes in X direction, the control electric field applied to the phase-modulator is in Z direction, perpendicular to incident beam. The control electric field is produced by the electric potential difference on the control electrode 17 and common electrode 16. Each phase-modulator can be independently controlled. An irregular phased-array based on that can focus the beam in three-dimensional space. The array of phase-modulators of such device has several layers. There is insulator layer 26 between the layers of phase-modulators to isolate the electrodes of the phase-modulators of each layer. The electro-optical material 13 used in such array is the solid electro-optical material.

FIG. 13 illustrates a two-dimensional array of phase-modulators with longitudinal phase modulation. Each phase-modulator can be independently controlled. The incident light 18 enters the phase-modulator along X direction, and the electric field of the control signal in the phase-modulator is also along the X direction in parallel with the incident light. In this structure, the common electrode 16, control electrode 17 and the control line 20 connects to each electrode are all transparent. There is the transparent insulator layer between the control line 20 and control electrode 17, which makes the control line connects to the control electrode 17 of a individual phase-modulator.

FIG. 14 is another type of two-dimensional array of longitudinal phase-modulators. Sixteen phase-modulators are shown in the figure. The structures of FIG. 14 and FIG. 13 are similar. The only difference is that in the FIG. 14, the control line 20 is placed in the gap between the phase-modulators.

4. The Placement of the Phase-controlled Element in the Irregular Phased-array

For the phase-controlled element described above, the focal point of the lens is the effective position of the phase-controlled element, and the array of the focal points 27 of the lenses, as shown in FIG. 5, is the array of the effective positions. By shifting the position of the focal point, the irregular placement of the effective position of the phase-controlled element can be obtained. Therefore, it can be done in this way: the geometric position of the phase-controlled element itself forms a regular array while the effective position of the phase-controlled element forms an irregular array. In other words, though we have constructed an irregular virtual array of effective point-source of light, the array of phase-modulators can still be a regular array. The geometric position of the lens can also be a regular array. It only needs to shift the optical axis 28 of the lens 23 (FIG. 8 and FIG. 9) to alert the position of the focal point such that the focal points form an irregular array. Since the geometric position of the phase-controlled element is placed in a regular pattern, this method simplifies the fabrication of the phase-modulator array 12, and enhances the overall efficiency of the irregular phased-array device.

If the variation range of the effective position of a phase-controlled element is from 0 to d, the variation range of the effective distance (i.e. distance between the effective positions) between two adjacent phase-modulators will be 0 to 2d. Such large variation on the effective distance between adjacent phase-controlled elements is indeed the advantage of employing the array of lenses in the irregular phased-array. In fact, the optical axis of the lens does not have to be within the boundary of the phase-modulator. The structure of the optical lens can even shift the optical axis to outside of the periphery of the lens.

The another way to make the phase-modulator form irregular pattern is to use phase-modulator of irregular size. In this way, though it can also keep the spacing between the phase-modulator constant, the structure of the array of phase-modulator and the array of lenses become very complex.

When the size of the phase-controlled element is comparable to the wavelength, the geometric center of the phase-controlled element is the effective position of the phase-controlled element. When distance between the phase-controlled elements is much large than the wavelength, it is possible to let the phase-controlled element itself to form an irregular pattern to realize the irregular phased-array.

As mentioned before, the distance between the effective positions of the adjacent phase-controlled elements is a random variable within a certain range, its value can be generated by the random number generator of a computer. For a given condition, there can be many in principle equivalent arrangement of the effective positions of the phase-controlled elements. A good arrangement should make the background radiation of the phased-array low and uniform. The best arrangement can be selected from various arrangements through computer simulation.

It is relatively simple to have a one-dimensional array of phase-controlled elements to form an irregular pattern: The distance between the effective position of the adjacent phase-controlled elements is a random variable within a certain range.

To form an irregular pattern for a two-dimensional array of phase-controlled elements, there are two ways. One method is to place the effective position of phase-controlled elements in columns and rows, and the distance between the columns and rows is a random variable within a certain range. This method is particularly suitable to the two-dimensional phased-array as shown in FIG. 10 and FIG. 11. Another method is to place the effective position of the phase-controlled elements in a completely random pattern (i.e. they are no longer aligned in columns and rows). This method is suitable to the two-dimensional phased-array as shown in FIG. 12, FIG. 13 and FIG. 14.

No matter how the effective position of the phase-controlled element forms an irregular pattern, for a particular irregular phased-array, the effective position of each phase-controlled element is known, and the phase-relationship among the phase-controlled elements and the phase shift needed are all determined based on the effective position of each phase-controlled element.

5. Sub-array Control

The present invention further proposed the sub-array technique for the irregular phased-array, to further simplify the irregular phased-array device and controller, and to reduce the control lines between the phased-array and the controller. The method is to divide the phased-array into plurality of sub-arrays. Each sub-array is identical. Here, the identical means that in each sub-array, the effective position of the phase-controlled element is placed in a same pattern, but in each sub-array, the placement of the geometric position, shape, size of the phase-controlled elements can be either identical or not identical, even the number of phase-controlled elements can be identical or not identical. The controller controls each sub-array in parallel, i.e. the corresponding phase-controlled elements in each sub-array receives the same control signal from the controller. Therefore, the control electrode of the corresponding phase-controlled element in each sub-array are connected in parallel.

Figure 15:
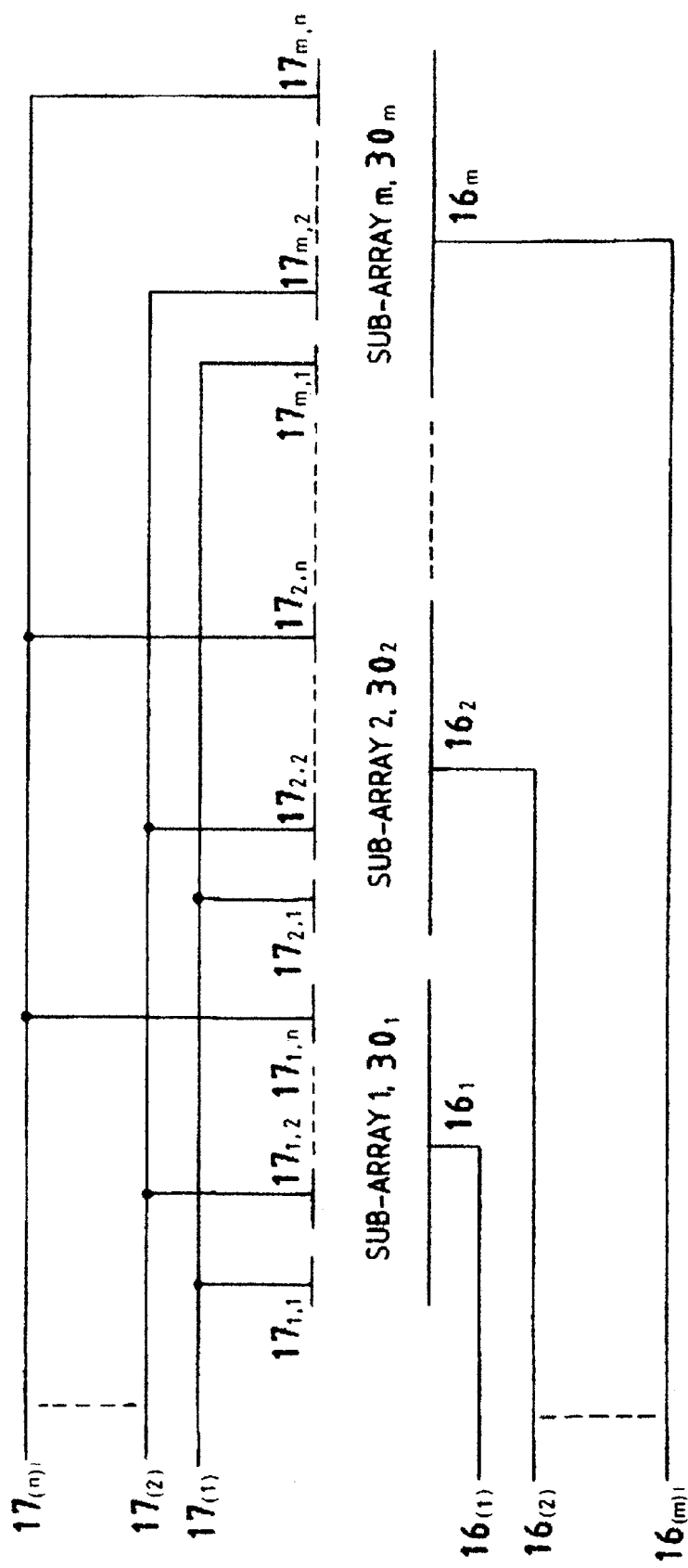
FIG. 15 illustrates the connection of the control lines for the sub-arrays of the irregular phased-array.

FIG. 15 illustrates connection of the electrodes of an irregular phased-array with sub-arrays for the structure shown in FIG. 5. In FIG.15, the control electrodes $17_{1,1}$, $17_{2,1}$, . . . , $17_{m,1}$ of sub-array $30_1$, $30_2$, . . . , $30_m$ are all connected in parallel to the control line $17_{(1)}$, and receive the same control signal. But in each sub-arrays, the phase-controlled element on different position has its own control line $17_{(1)}$, $17_{(2)}$, . . . , $17_{(n)}$. The controller, through the each control line, makes independent control on the each group of phase-controlled elements that are on different positions in each sub-array.

For the present invention, each sub-array has its own common electrode. In FIG. 15, $16_1$, $16_2$, . . . , $16_m$ are the common electrodes of sub-array $30_1$, $30_2$, . . . , $30_m$ respectively. The controller can independently control the common electrode of each sub-array. This is very different from the sub-array technique of prior arts.

In each sub-array, if taking the zero volt electric potential as the reference electric potential, the electric potential applied to the control electrode of each phase-modulator varies from zero to a positive value, while the electric potential applied to the common electrode of each phase-modulator varies from zero to a negative value. The control signal applied to each control electrode makes the phase-modulators that are at the same corresponding position in each sub-array generate a same amount of phase-modulation. While the control signal applied to the common electrode of each sub-array generate an additional amount of phase-modulation for the entire sub-array, in order to have the phase of the light from each sub-array match with each other. It should be pointed out that exchanging the polarity between the control electrode and common electrode or using other non-zero electric potential as the reference, the result will be essentially the same.

Figure 4:
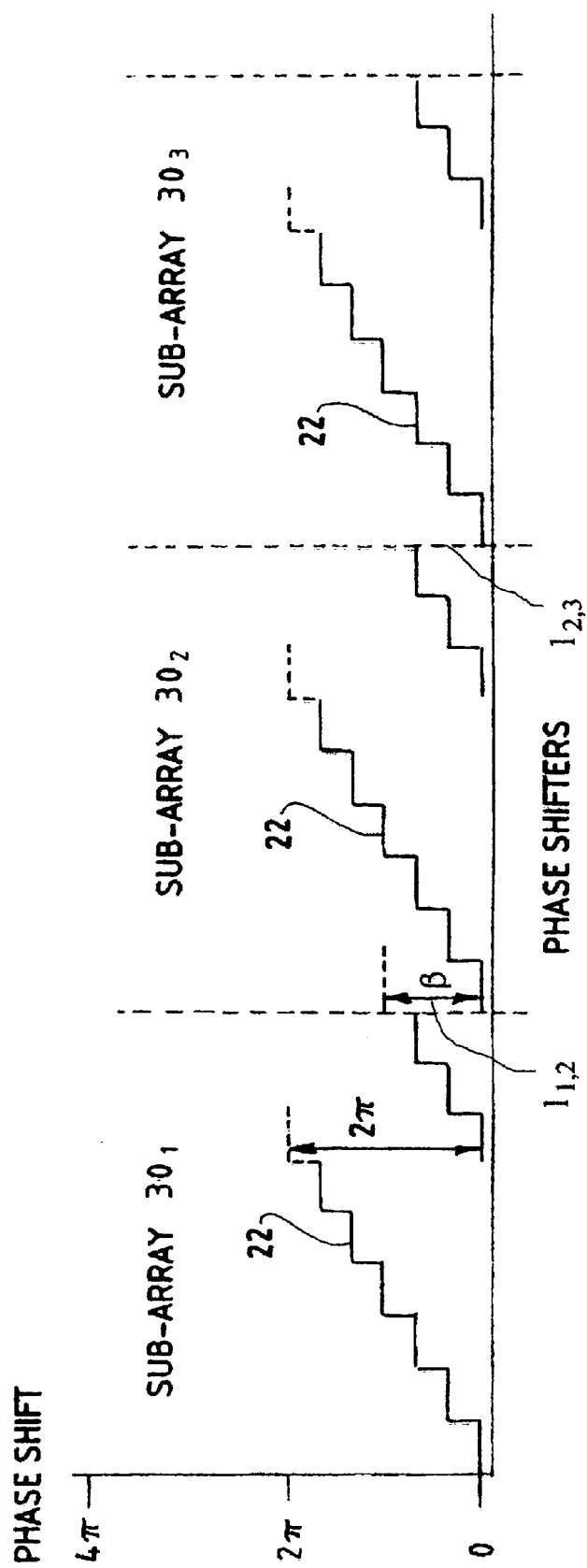
FIG. 4 illustrates the phase mismatch among the sub-arrays of the prior art sub-array technique.
Figure 16:
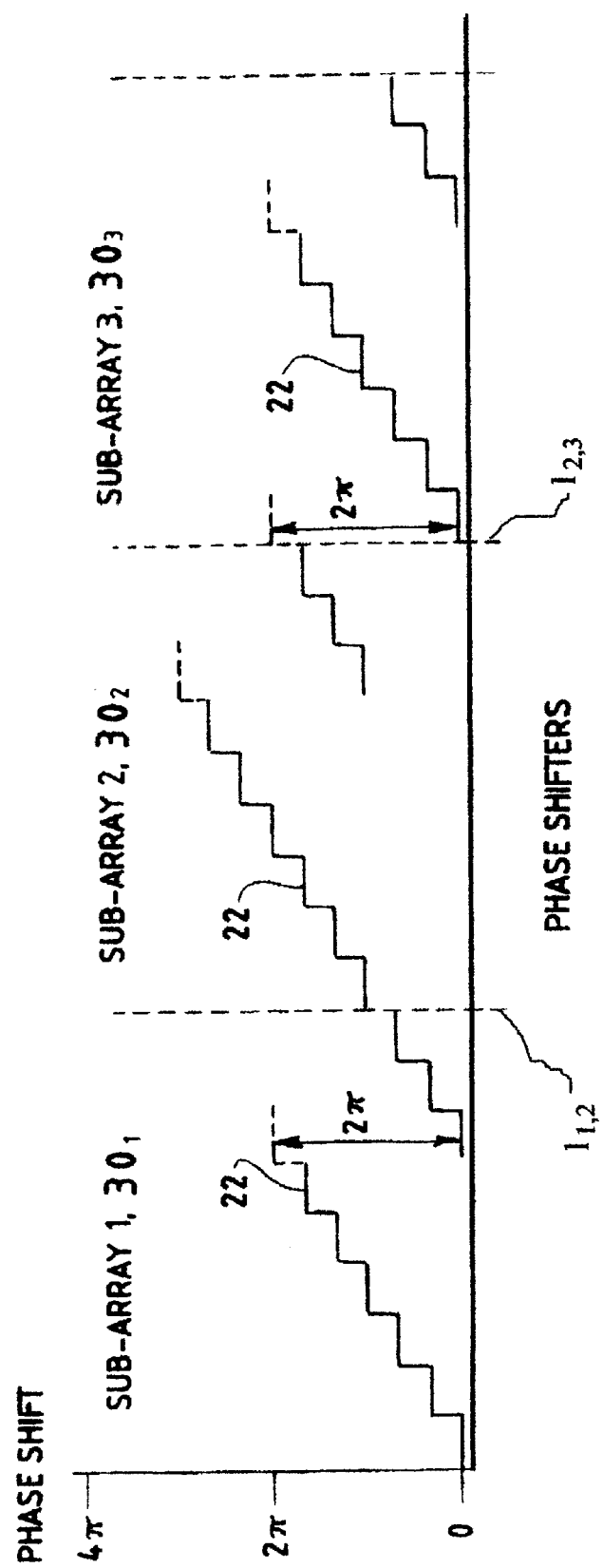
FIG. 16 illustrates the phase match among sub-arrays.

Therefore, the present invention has both capabilities of controlling each sub-array in parallel and controlling each sub-array independently. FIG. 16 is used to illustrate the sub-array controlling method of the present invention. In the figure, the horizontal axis represents the position of the phase-modulator and sub-array, and the vertical axis represents the phase relationship of each phase-controlled element and three sub-arrays $30_1$, $30_2$, and $30_3$. In the given direction, the light from each phase-controlled element within a sub-array is in-phase with each other, however, the light from different sub-arrays is generally not in-phase with each other in the given direction. In the present invention, the common electrode of each sub-array is independently controlled, therefore, it is possible to independently alert the electric potentials on the common electrode $16_1$, $16_2$, ..., $16_m$ (FIG. 15) of each sub-array, to make the stair curve 22 shift up or down (FIG. 16) until phase match among the light from each sub-arrays is achieved. As shown in FIG. 16, with the method of present invention, it is always possible to adjust the phase difference between two adjacent phase-controlled elements belonging to two adjacent sub-arrays to $\beta=0$ or $\beta=2\pi$ (FIG. 4). It can be seen in FIG. 16 that the shape of the stair curve 22 of the sub-array $30_2$ is same (with others), but curve has bee shifted upward. In the figure, at $I_{1,2}$ and $I_{2,3}$, the stair curves match with each other. The range of the phase-modulation needed for each phase-modulator increases one more wavelength, i.e. $2\pi$.

Figure 17:
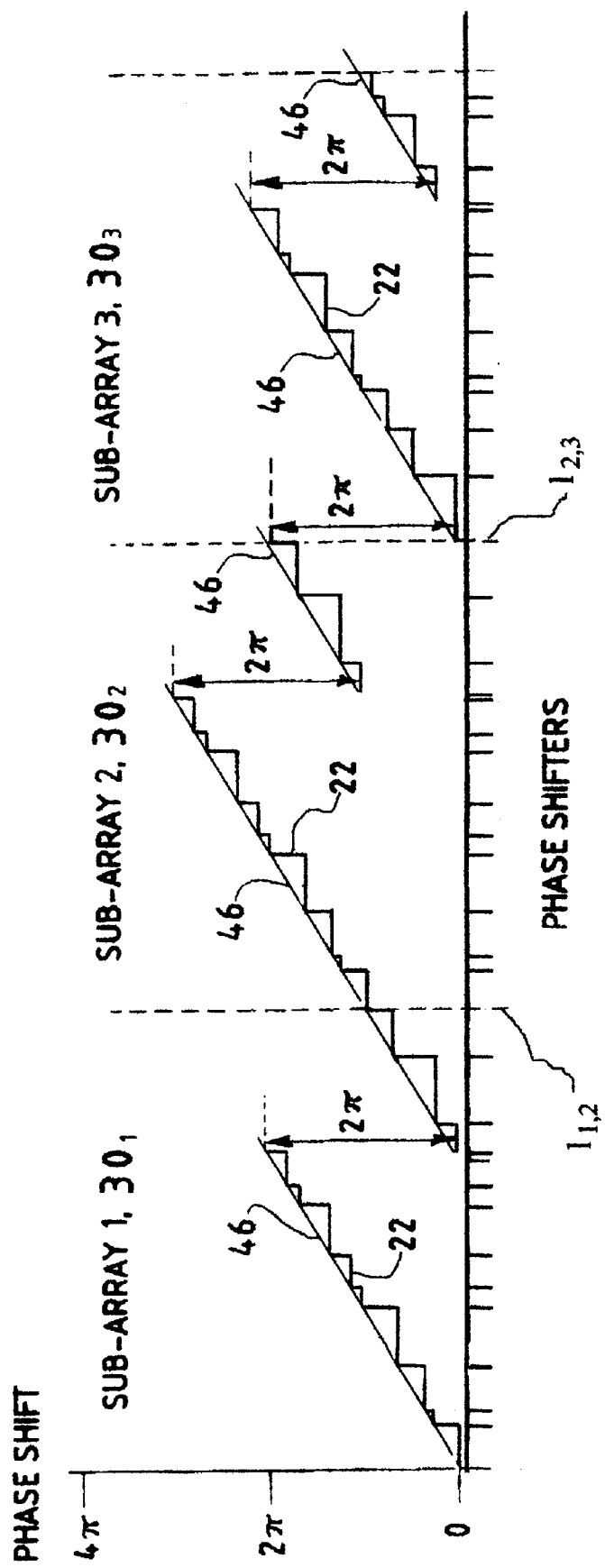
FIG. 17 illustrates the phase match among sub-arrays in the irregular phased-array.

In irregular phased-array, the phase-controlled elements form an irregular pattern. FIG. 17 illustrates the application of the sub-array controlling method of the present invention in the case of irregular phased-array. In the figure, the horizontal axis represents the effective position of the phase-controlled element, and the vertical axis represents the phase relationship among the phase-controlled elements of three adjacent sub-arrays $30_1$, $30_2$, and $30_3$. In the figure, the irregular phased-array is presented as the irregularities among the length and height of each step of the stair curve. However, besides the length of the last step, the shape of the stair curve 22 of each sub-array is identical. The difference of the length of the last step is to illustrate the irregular placement of the irregular sub-arrays in the phased-array (details will be in the following). The figure also illustrates the match of the wavefront of each sub-array. The sub-array controlling method of the present invention can be used for regular phased-array as well as for irregular phased-array.

Figure 18:
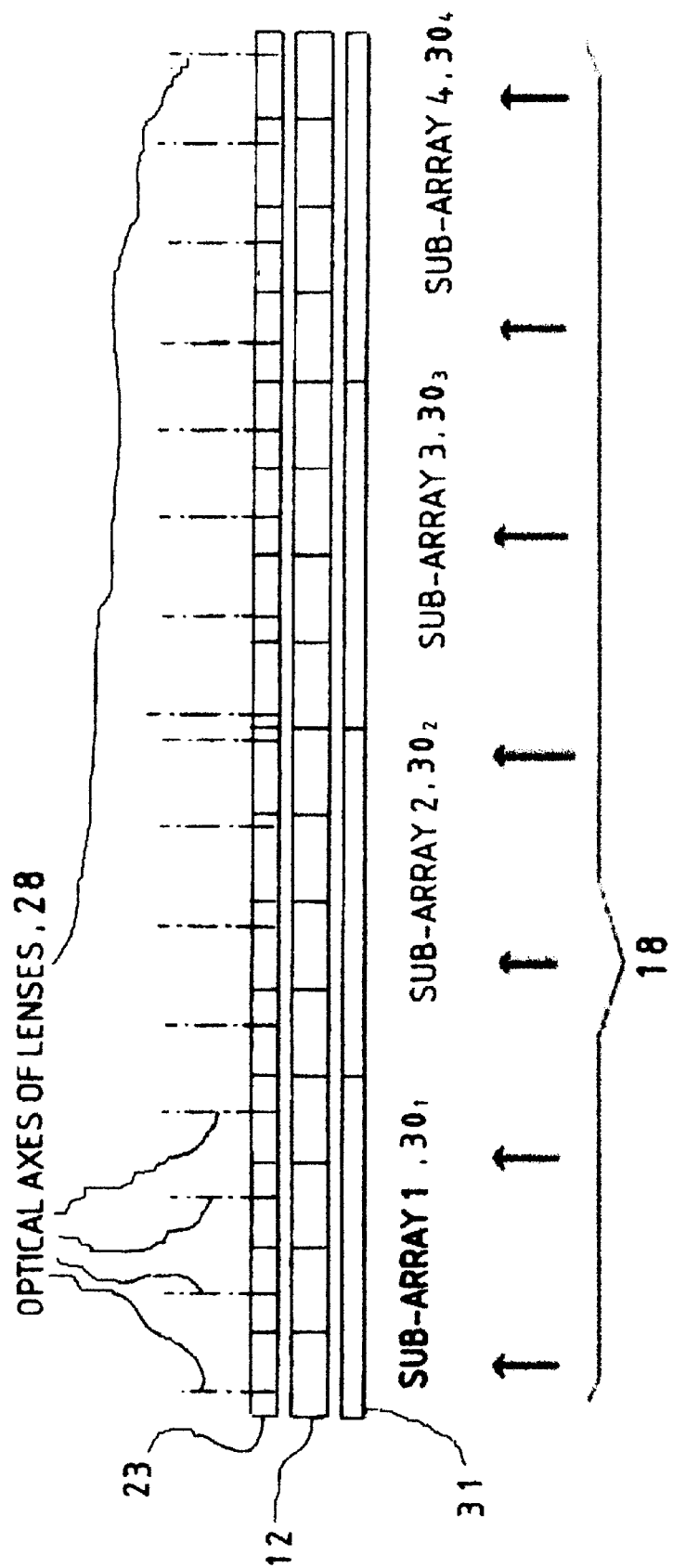
FIG. 18 illustrates the sub-array technique using additional sub-array phase compensation phase-modulators.
Figure 19:
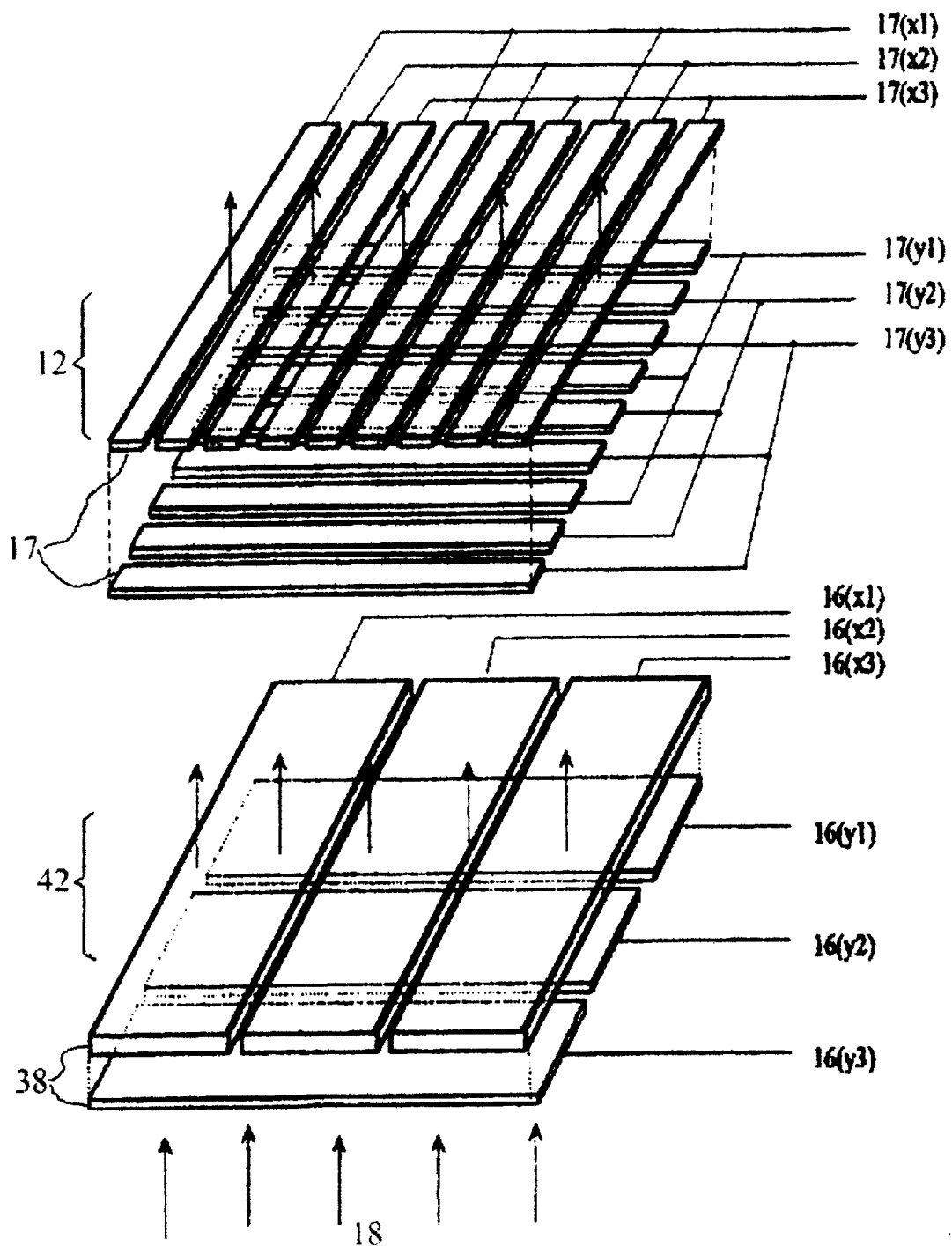
FIG. 19 illustrates the structure of a two-dimensional phased-array having sub-arrays with additional phase compensation phase-modulators.

The method mentioned above that realizes the phase-match among the sub-arrays in a given direction through the controlling of the common electrode of each sub-array can be used for one dimensional phased-array such as shown in FIG. 5, FIG. 6 and FIG. 7, and for two-dimensional phased-array as shown in FIG. 10. For the two-dimensional phased-array as shown in FIG. 11, an additional sub-array phase compensation phase-modulator 31 is needed for each sub-array to shift the stair curve as shown in FIG. 16 in order to realize the phase match among the sub-arrays, as illustrated in FIG. 18. The structure of the sub-array phase compensation phase-modulator is same with the two-dimensional array of phase-modulator shown in FIG. 11, but the width of its strip electrode is the size of the sub-array. The control method for the sub-array phase compensation phase-modulator is also similar with that for the two-dimensional array of phase-modulators shown in FIG. 11, i.e. one group of electrode is used to realize the phase-match for the sub-array which has the same orientation as this group of strip electrode, and the another group of electrode is used to realize the phase-match for the sub-array which has the same orientation as another group of strip electrode. FIG. 19 illustrates a two-dimensional array of phase-modulators 12 and the corresponding array of sub-array phase compensation phase-modulators 42. FIG. 19 contains nine two-dimensional sub-arrays, and each sub-array has nine phase-modulators. The 17(x1), 17(x2) and 17(x3) are the control lines to control the deflection of the beam of light in x direction. The 17(y1), 17(y2) and 17(y3) are the control lines to control the deflection of the beam of light in y direction. The array of sub-array phase compensation phase-modulators 42 consists of electrode 28 and Electro-optical material between the electrodes. The 16(x1), 16(x2) and 16(x3) are the control lines for the sub-array phase compensation phase-modulators corresponding to the control signals for deflecting the beam of light in x direction. The 16(y1), 16(y2) and 16(y3) are the control lines for the sub-array phase compensation phase-modulators corresponding to the control signals for deflecting the beam of light in y direction. The structure shown in FIG. 19 coupling with an array of lenses of eighty-one lenses can form a phased-array of eighty-one phase-controlled elements. These eighty-one lenses also form nine sub-arrays accordingly, and each sub-array has nine lenses. It is pointed out here that the number of sub-arrays and the number phase-controlled elements do not have to be equal. It can have other combinations according to the total number of phase-controlled elements in the phased-array.

Figure 20:
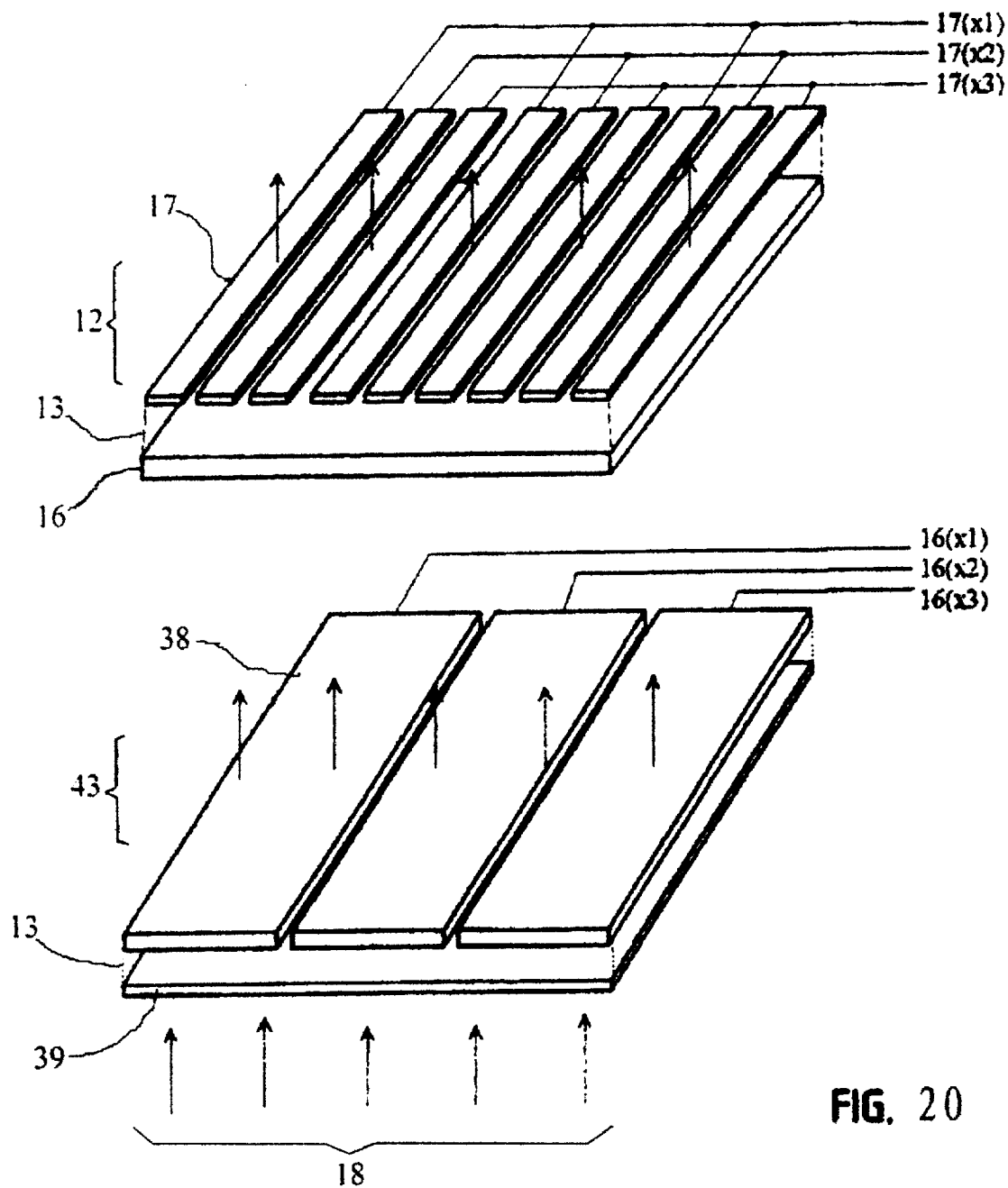
FIG. 20 illustrates the structure of a one-dimensional phased-array having sub-arrays with additional phase compensation phase-modulators.

The method of the sub-array phase compensation phase-modulator shown in FIG. 18 can also be used for one-dimensional phased-array as shown in FIG. 5, FIG. 6 and FIG. 7. The FIG. 20 illustrates a one-dimensional array of phase-modulators 12 with an array of sub-array phase compensation phase-modulators 43. The FIG. 20 contains three one-dimensional sub-arrays, and each sub-array has three phase-controlled elements. When using the method of the sub-array phase compensation phase-modulator as shown in FIG. 20, there is no need to independently control the common electrode of each sub-array, therefore, the entire array of phase-modulators needs only one common electrode 16. The method of the sub-array phase compensation phase-modulator as shown in FIG. 20 can also be used for two-dimensional phased-array as shown in FIG. 10. A two-dimensional phased-array formed with sub-arrays can be constructed with two one-dimensional arrays of phase-modulators along with the sub-array phase compensation phase-modulator as shown in FIG. 20, according to method shown in FIG. 10. At this time, each two-dimensional sub-array actually contains two sub-array phase compensation phase-modulators. A two-dimensional phased-array with sub-arrays can be constructed with cascading of a two-dimensional array of phase-modulators as shown in FIG. 10 along with an arrays of sub-array phase compensation phase-modulators 42 as shown in FIG. 19.

Figure 21:
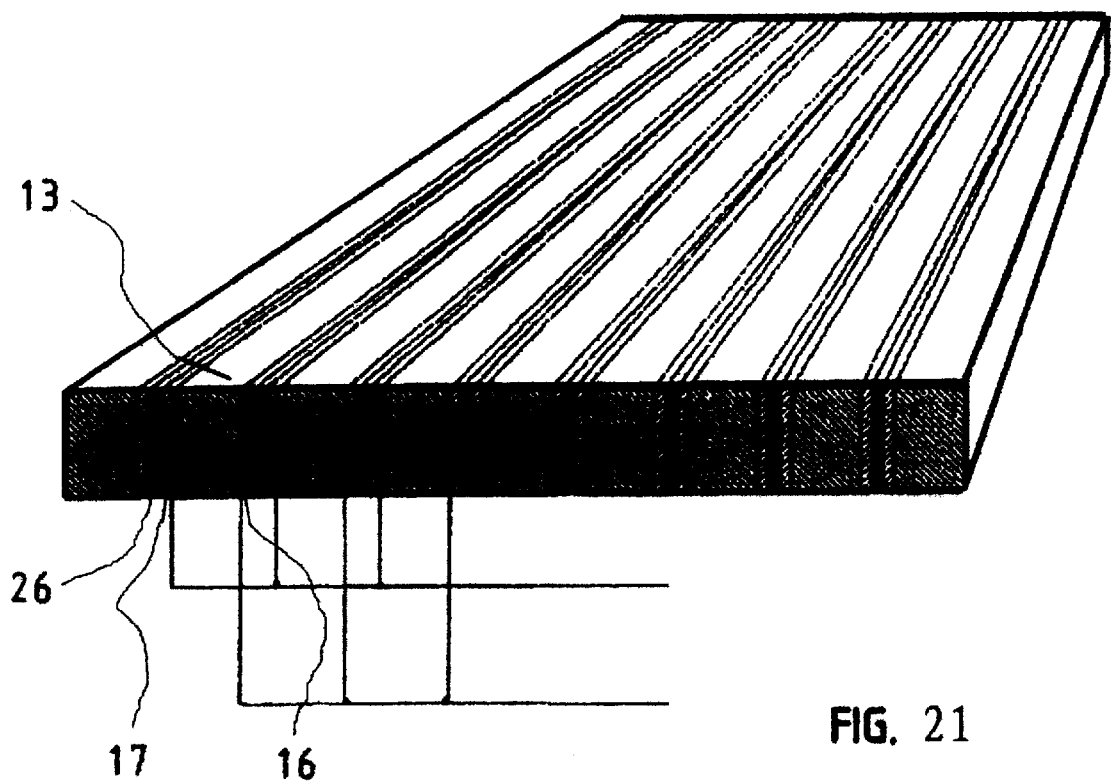
FIG. 21 illustrates how to construct the sub-array phase compensation phase-modulator with transverse phase-modulators.

FIG. 20 uses longitudinal phase-modulator for illustration. Similarly, we can also use the transverse phase-modulators as shown in FIG. 7 to construct the array of phase-modulators 12 and array of sub-array phase compensation phase-modulators 42. When the array of phase-modulators is a transverse phase-modulators as shown in FIG. 7, the array of sub-array phase compensation phase-modulators can assume same structure as the array of phase-modulators, except connecting a number of phase-modulators in parallel according the size of the sub-array, as shown in FIG. 21. Connecting three phase-modulators in parallel can be used for a sub-array with three phase-modulators.

Regardless of controlling common electrode or sub-array phase compensation phase-modulator, the control signal is substantially same. It is also one of the advantages of the present invention.

It should be pointed out that for the two-dimensional array of sub-array phase compensation phase-modulators shown in FIG. 19 or for the two-dimensional array of sub-array phase compensation phase-modulators formed by cross-cascading two one-dimensional arrays of sub-array phase compensation phase-modulators shown in FIG. 20, the independent control of each sub-arrays is still not an absolutely independent (details will be in the following). The advantage of doing so is that the control lines are greatly reduced. Such method of sub-array phase compensation phase-modulator array can be used for two-dimensional regular phased-array, can also be used for two-dimensional phased-array with regular placement of irregular sub-arrays (i.e. the phase-controlled elements in each sub-array form an irregular pattern, while the sub-arrays are placed in a regular pattern in the phased-array), details are in the following.

The above description is based on the strip phase-modulator array as shown in FIG. 10 and FIG. 11. However, the controlling method can also be used for the two-dimensional irregular sub-array based on the phase-modulator array as shown in FIG. 12, FIG. 13 and FIG. 14.

6. The Structure of Sub-array of the Irregular Phased-array

The sub-array technique of the irregular phased-array of present invention contains two meanings: First, the sub-array of the irregular phased-array itself is an irregular array. Second, the sub-arrays of the irregular phased-array are placed irregularly with respect to other sub-arrays within the phased-array. We emphases again here that in the sub-arrays of the irregular phased-array, the pattern of the placement of the effective position of the phase-controlled element are identical, though the geometric position, shape and size of the phase-controlled element may be different with each other.

For the convenience of the description, we define the distance between the effective positions of two phase-controlled elements at the two side of the boundary between two sub-arrays as "effective spacing" between the sub-arrays. This is the distance between two focal points of the lenses at the two side of the boundary between two sub-arrays. In the FIG. 22 and FIG. 23, e1, e2 and e3 represent the effective spacing. The distance between the physical boundary of the two adjacent sub-arrays is defined as "spacing" between the sub-arrays. In the FIG. 22 and FIG. 23, s1, s2 and s3 represent the spacing. The effective spacing between sub-arrays in present invention is irregular. That is: not only the effective position of the phase-controlled elements within sub-array forms irregular pattern, but the effective array (i.e. the array of the effective position of the phase-controlled elements in a sub-array) of the sub-array is also placed irregularly with respect to each other in the phased-array. The method of placing the effective array of the sub-array irregularly in the phased-array is shown in FIG. 22 and FIG. 23.

Figure 22:
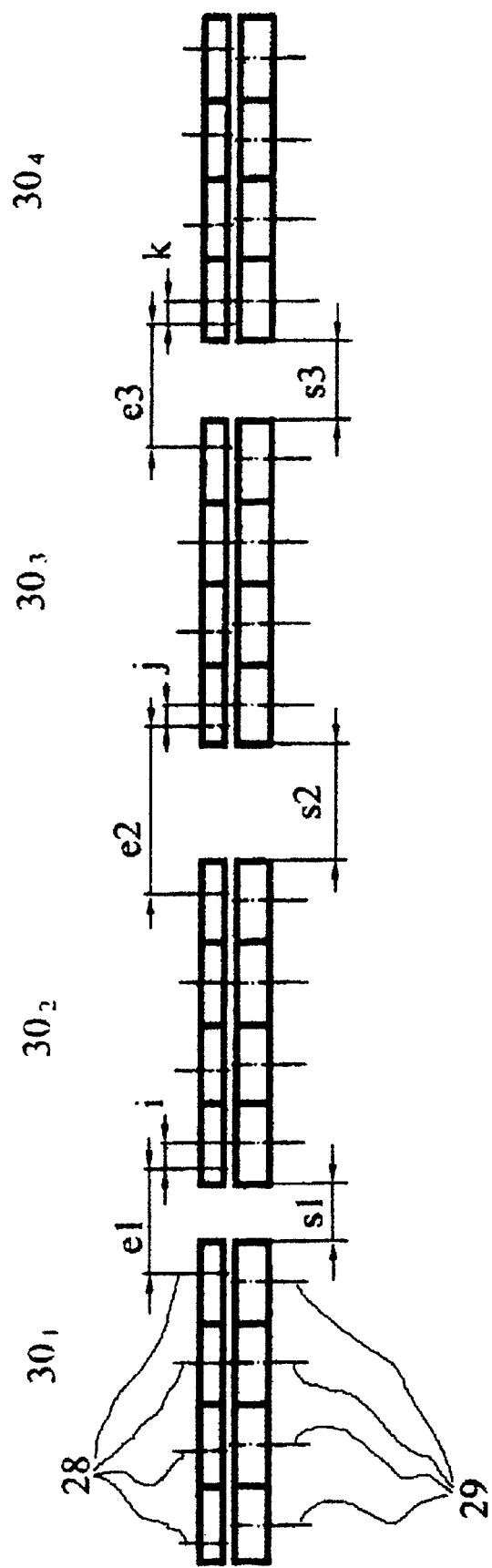
FIG. 22 illustrates the irregular placement of the sub-arrays.
Figure 23:
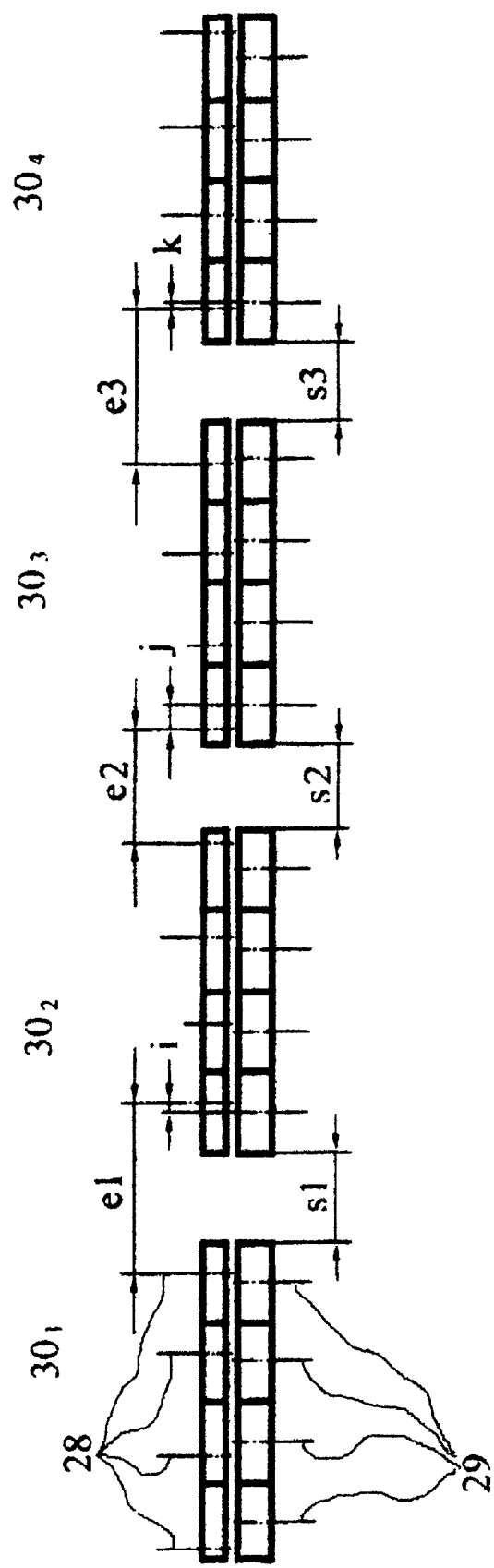
FIG. 23 illustrates another irregular placement of the sub-arrays.

In FIG. 22, in each sub-array, the position of the optical axis 28 (of the lens) of the corresponding phase-controlled element relative to the axis of the geometric center 29 (FIG. 8) of the phase-controlled element is fixed, i.e. i=j=k. The irregularity of the effective spacing between sub-arrays is realized through the changing of the spacing between sub-arrays, i.e. s1≠s2≠s3. In FIG. 23, the spacing between the sub-array is kept constant, i.e. s1=s2=s3. The irregularity of the effective spacing between sub-arrays is realized through changing the position of the optical axis 28 of the lens, i.e. in each sub-array, the position of the virtual array of the effective point-source of point generated by the lenses relative to the array of phase-modulators is not fixed, i≠j≠k.

Employing the sub-array technique can significantly reduce the control lines. For example, a phased-array of 1024 phased-controlled elements can be divided into 32 sub-arrays, and each sub-array contains 32 phase-controlled elements. We can use 32 control lines to parallel control the 32 control electrodes of the phase-modulator in each sub-array, and use another 32 control lines to control the 32 common electrodes of the sub-arrays. When using the sub-array phase compensation phase-modulator, the situation is the same: 32 control lines are used to parallel control the 32 phase-modulators in each sub-array, and the another 32 control lines are used to control the 32 sub-array phase compensation phase-modulators. The total control line is 32+32=64. If not using the sub-array technique of the present invention, the 1024 phase-modulators will need 1024 control lines.

Figure 24:
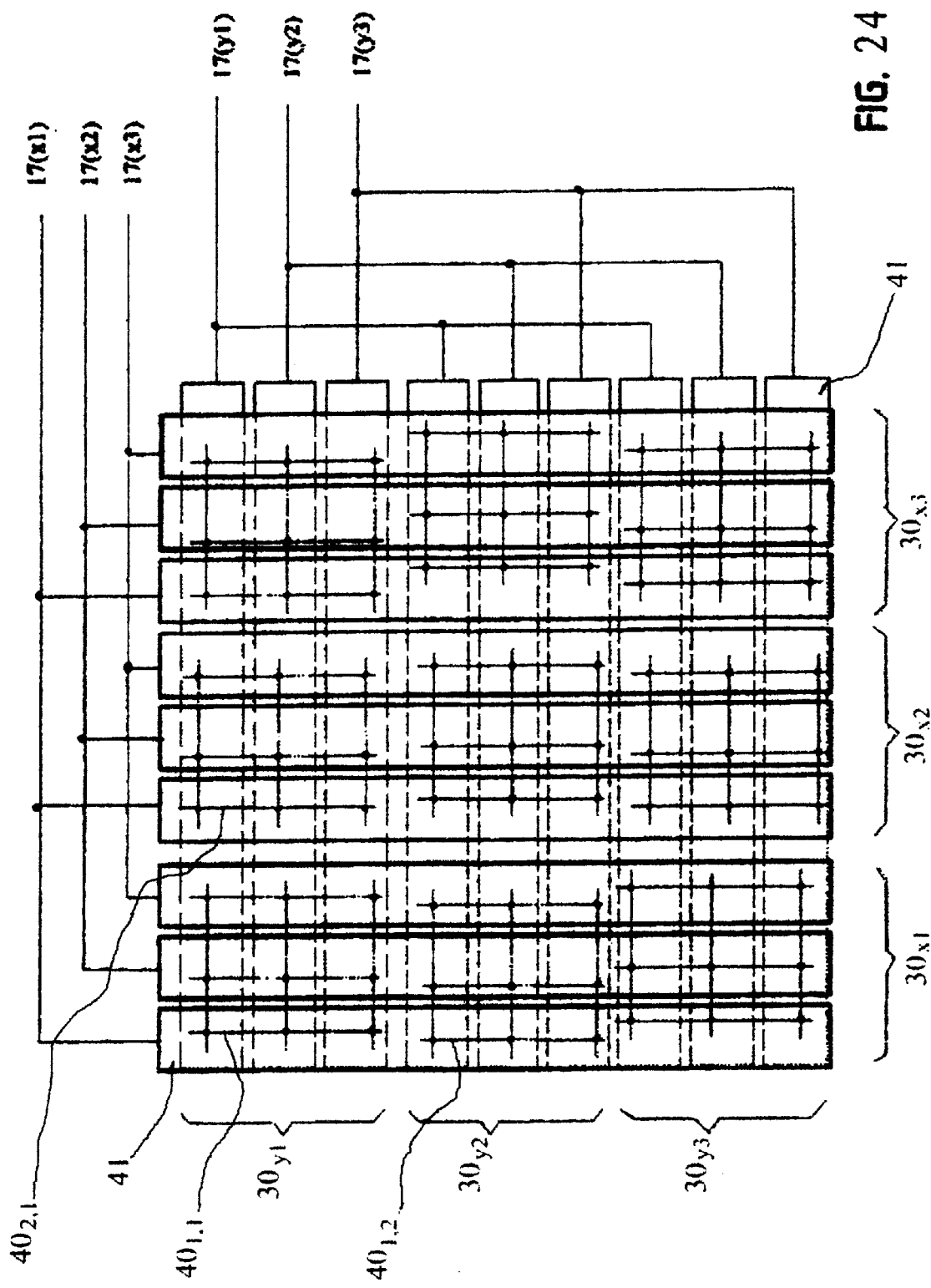
FIG. 24 illustrates the two-dimensional irregular placement of the sub-arrays.

In the following, we will further describe the placement of the two-dimensional irregularly placed irregular sub-arrays. FIG. 24 illustrates an example of a two-dimensional irregularly placed irregular sub-arrays. The figure contains nine two-dimensional irregular sub-arrays, and each sub-array contains nine phase-controlled elements. This two-dimensional array can be constructed with the method shown in FIG. 11 or FIG. 10. The 17(x1), 17(x2) and 17(x3) are the control lines to control the deflection of the beam in X direction. The 17(y1), 17(y2) and 17(y3) are the control lines to control the deflection of the beam in Y direction. Grouping the strip electrode (or the phase-modulator with strip electrode) 41 into three groups (one-dimensional array) $30X_1$, $30X_2$ and $30X_3$ and another three groups (one-dimensional array) $30Y_1$, $30Y_2$ and $30Y_3$. In the figure, the nine dark dot at the crosses of the three horizontal and three vertical broken lines represent the effective positions of the nine phase-controlled elements of each sub-array in the two-dimensional phased-array. The $40_{1,1}$, $40_{1,2}$, $40_{2,1\ 9}$ . . . represent each two-dimensional sub-array. Just as illustrated in the figure, the placement of the effective position of the phase-controlled element in each two-dimensional sub-array is identical (in this example, within each sub-array, the effective position is placed in rows and columns while the distance between the rows and columns is irregular), and the placement of each sub-array is irregular within the phased-array.

Figure 25:
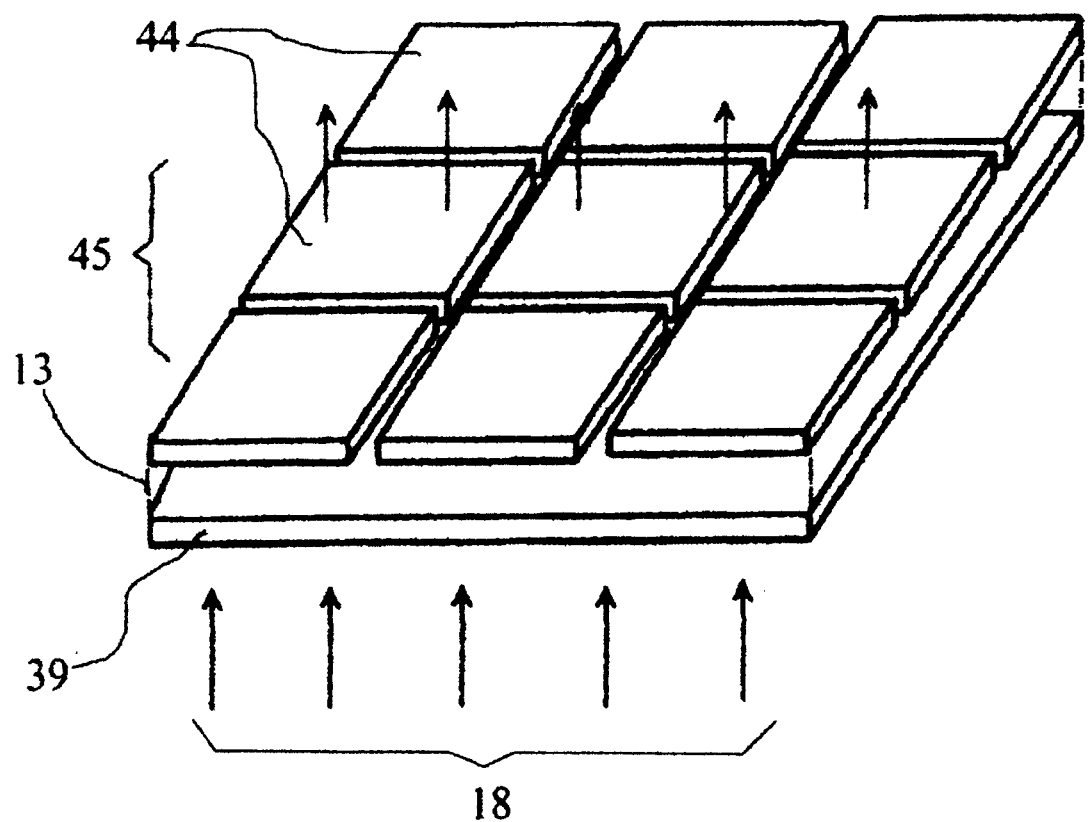
FIG. 25 illustrates the array of phase-modulators for the sub-array phase compensation in a two-dimensional phased-array.

Now, the "independent" control of the two-dimensional sub-arrays must be completely independent. We can use the method shown in FIG. 25 to do the independent control for each sub-array. The sub-array phase compensation phase-modulator array 42 shown in FIG. 25 is formed by the phase-modulator that consists of control electrode 44, common electrode 39 and the Electro-optical material between the two electrodes. The size of each sub-array phase compensation phase-modulator is as large as the corresponding sub-array. The sub-array phase compensation phase-modulator array 42 in FIG. 19 can be replaced with the sub-array phase compensation phase-modulator array 45 in FIG. 25. The sub-array phase compensation phase-modulator array 45 in FIG. 25 can also be cascaded with two one-dimensional (strip electrode) phase-modulator arrays. It is also possible that in the structure shown in FIG. 10, changing the common electrode of a one-dimensional (strip) phase-modulator array into the electrode that is just like the control electrode 44 of the sub-array phase compensation phase-modulator array 45 in FIG. 25, such that each two-dimensional sub-array has a complete independent common electrode. For a two-dimensional irregular phased-array of 1000×1000 (i.e. a million) phase-controlled elements, it can be divided into 100 sub-arrays, and each sub-array contains 100×100 (i.e. 10,000) phase-controlled elements. Thus, we can use 100 control lines to parallel control the strip control electrode of each sub-array to steer the beam of light in X direction, and use 100 control lines to parallel control the strip control electrode of each sub-array to steer the beam of light in Y direction, and use another 100 control lines to control the sub-array phase compensation phase-modulator (or common electrode) of each sub-array to achieve phase match among the light from each sub-array. The total control lines are 300. If not using the sub-array technique of the present invention, it will need two thousand control lines. If not using the strip electrode structure, it will need a million control lines.

7. Reflective Irregular Phased-array

In the description of the above, we use the transmission irregular phased-array as example. However, the principle, concept and method proposed in the present invention can also be used for reflective irregular phased-array. Here, we only describe some special features of a reflective irregular phased-array, and the content similar to what has bee mentioned above will not be repeated.

Figure 26:
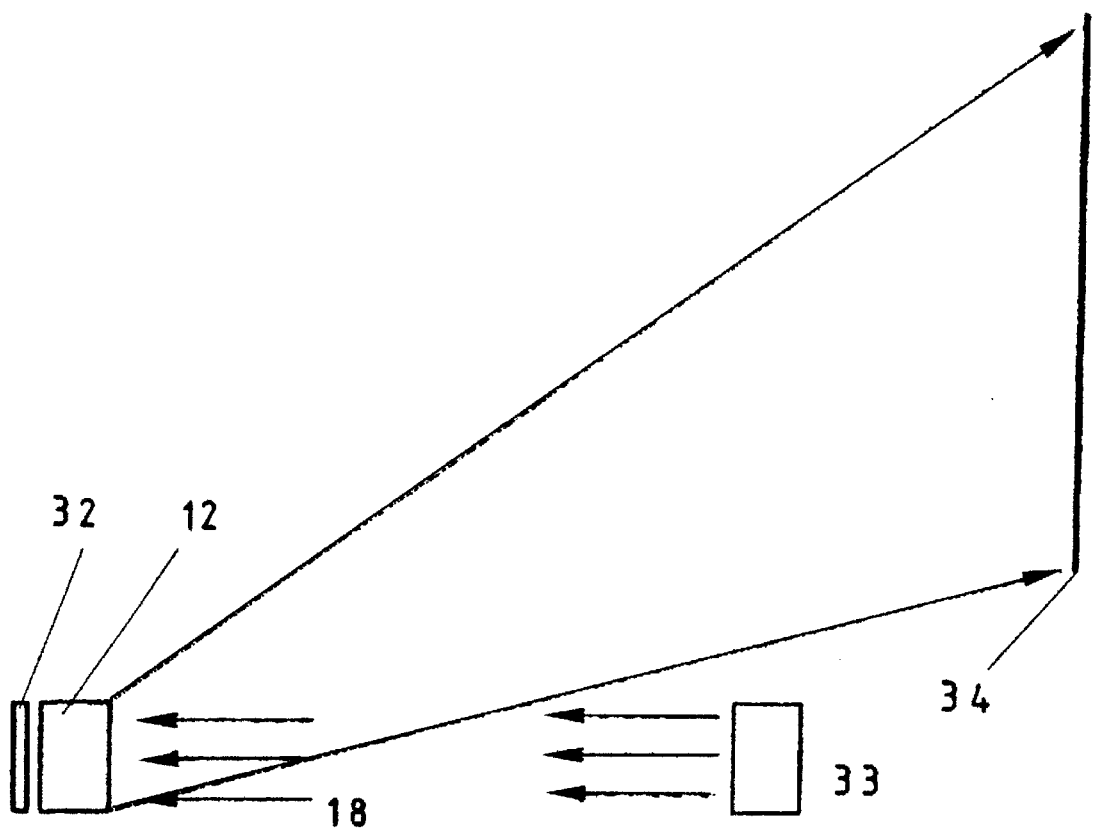
FIG. 26 illustrates the reflective phased-array device.
Figure 27:
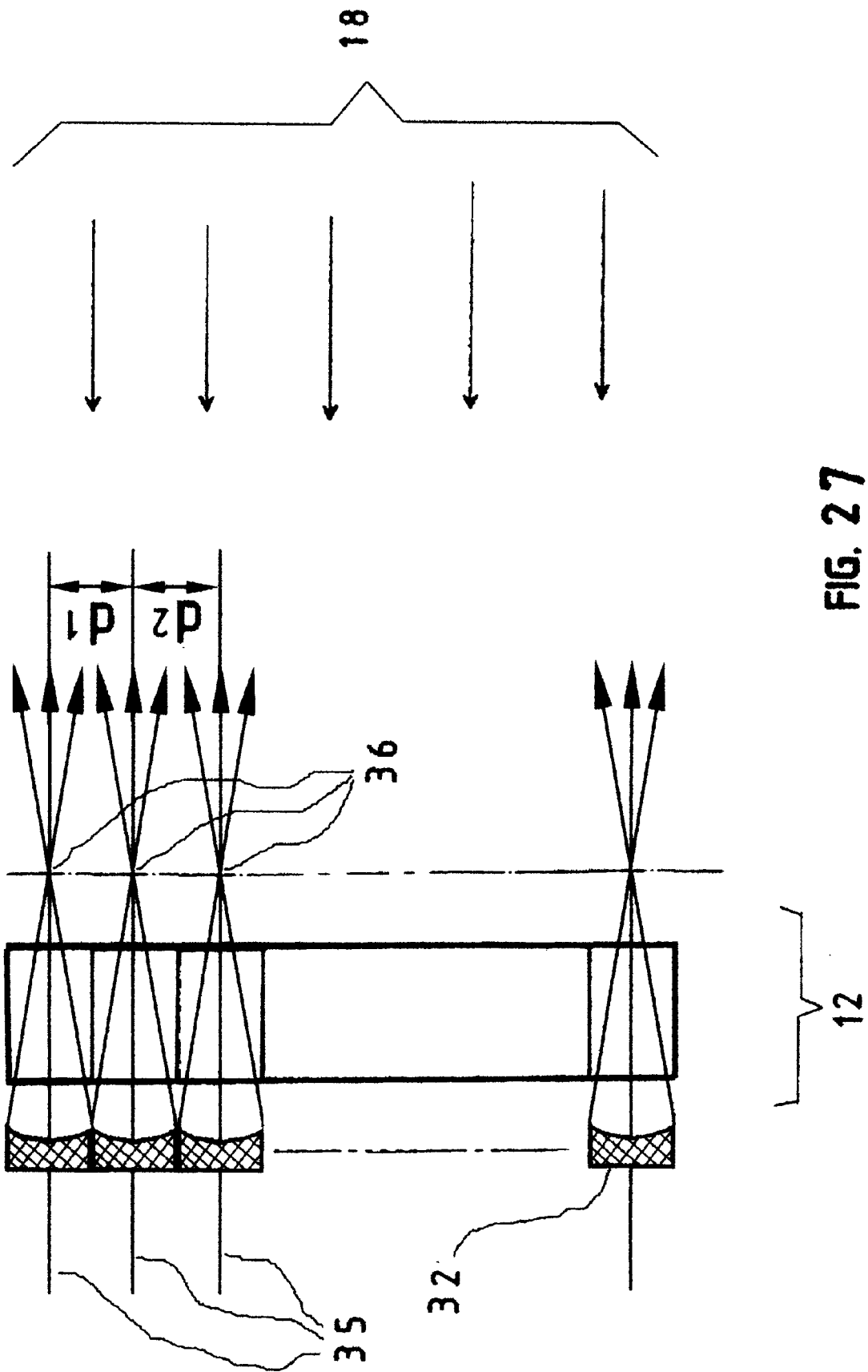
FIG. 27 illustrates the principle of the reflective phased-array.

FIG. 26 illustrates one way in which a reflective irregular phased-array is operated. The beam of light 18, from the light source 33, vertically incidents in, and passes the phase-modulator array 12, and then is reflected back by the array of minors 32 that is coupled with the phase-modulator array 12. The reflected light passes the phase-modulator array 12 again, and is focused by the minors 32. At the focal points of the minors, the irregular virtual array of effective point-source of light is created. By adjusting the phase of the light from each element, we can steer the beam of light to a given direction (e.g. to the screen 34). Here, similar to the transmission irregular phased-array, the effective position of each phase-controlled element is defined by the focal point of the minor, and the effective position of each phase-controlled element is generally not coincident with the geometric center of the phase-controlled element. Similar to the case of lens, generally, the mirror is not symmetrical. FIG. 27 further illustrates the structure of the reflective irregular phased-array. Incident light 18 pass through the phase-modulator array 12, is reflected back by the minors, and is focused at the focal point 36. Therefore, the irregular virtual phased-array of effective point source of light is created at the focal point 36.

Since the light passes the phase-modulator twice, therefore, under same condition, the thickness of the phase-modulator needed is only half of that for transmission phased-array, or, the voltage of the control signal needed is only half of that for a transmission phased-array.

Figure 28:
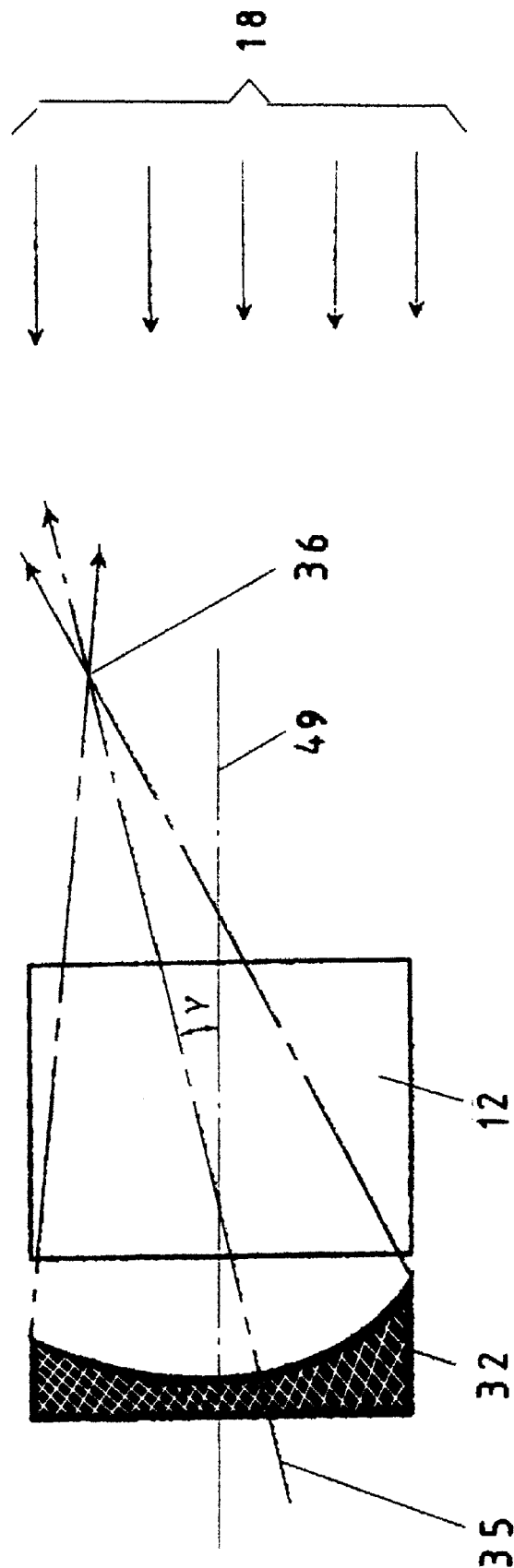
FIG. 28 illustrates the principle of the tilted mirror in the reflective phased-array.

Since the source of the light is in front of the irregular phased-array, to avoiding the beam of light from the phased-array from being blocked, we can shift the canning range to one side, e.g. shift upwards, as shown in FIG. 26. In this situation, we can tilt the mirrors to increase the efficiency of the reflective irregular phased-array. It should be pointed out that strictly speaking, at this time, 36 in FIG. 28 is the convergent point of the light, is not necessary the focal point of the mirror. But for the simplicity of description, we neglect the difference. In FIG. 28, the optical axis 35 of the mirror has an angle with respect to the normal direction 49 of the phased-array in order the to make the divergent range of the light from each element matches the scanning angular range of the phased-array. That is to say: in general, the optical axis of the mirror does not coincident with the axis of the geometric center of the corresponding phase-modulator, nor is parallel to the axis geometric center of the corresponding phase-modulator.

The minor dose not have to be the concave mirror as shown in FIG. 27 or FIG. 28. It can also be a combination of plan mirror, lens and grating. There is no substantial difference in principle and structure from the concave mirror as being used in present invention. Similar to the method of the lens, by choosing the optical parameters of the mirror such as aperture, focal length etc., the divergent angle of the light from each phase-controlled element can be controlled.

The various methods about the array of phase-modulators mentioned above can also be used for the reflective irregular phased-array, including one-dimensional array and various two-dimensional arrays. The sub-array methods mentioned before can also be used for the reflective irregular phased-array, therefore, we do not repeat these here.

8. Phase-controlled Light Emitter Array

As mentioned before, the prior art requires the distance between phase-controlled elements to be less than half wavelength (or one wavelength). Using 0.5 μm wavelength visible light as an example, it will require the distance between the phase-controlled elements to be less than 0.25 μm, therefore, the size of the phase-controlled elements must also be less than 0.25 μm. It is impossible to fabricate an array of phase-controlled light emitter with present technology in such compact space. However, the principle, concept and method of the irregular phased-array of the present invention can be used to construct a phase-controlled light emitter array, besides the space-fed phased-array described above. The present invention makes the distance between the phase-controlled elements no longer be limited by the wavelength of the light, therefore, the distance can be tens, thousands times of the wavelength, or even larger, thus, there will be enough space between the phase-controlled light emitters to be used to construct the electric circuit and structure to control the phase of the light from the light emitter. That makes the constructing phase-controlled light emitter array possible.

The phase-controlled light emitter means the light emitter that the phase of the light produced can be controlled, including various types of laser, light amplifier, optical fiber laser and laser diode etc. Large aperture phased-array can be fabricated with discrete phase-controlled light emitter, and phase-control unit. For small aperture phased-array, the light emitter and the control structure and circuit for the light emitter can be integrated together with micro-electronic technique.

Figure 29:
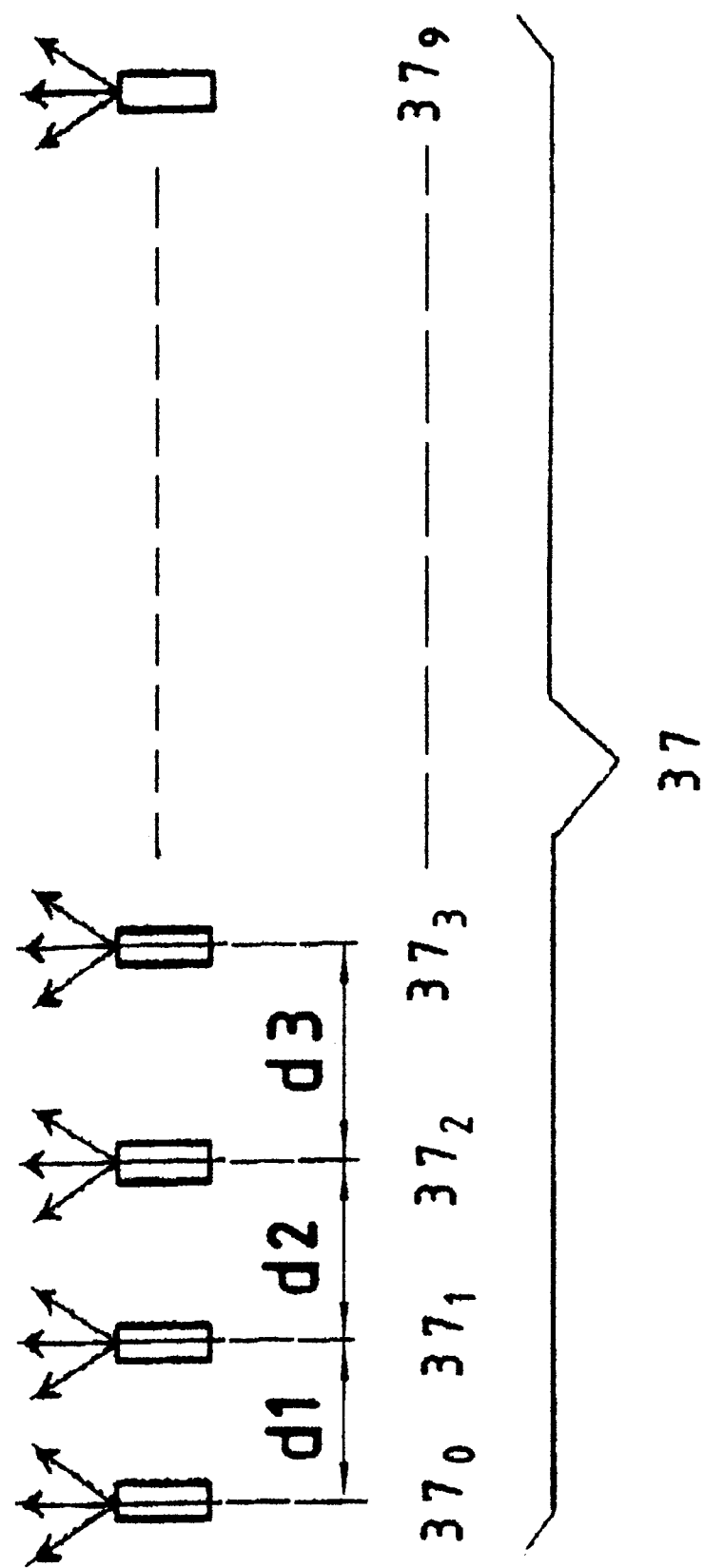
FIG. 29 illustrates the phased-array constructed with small size phase-controlled light emitters.
Figure 30:
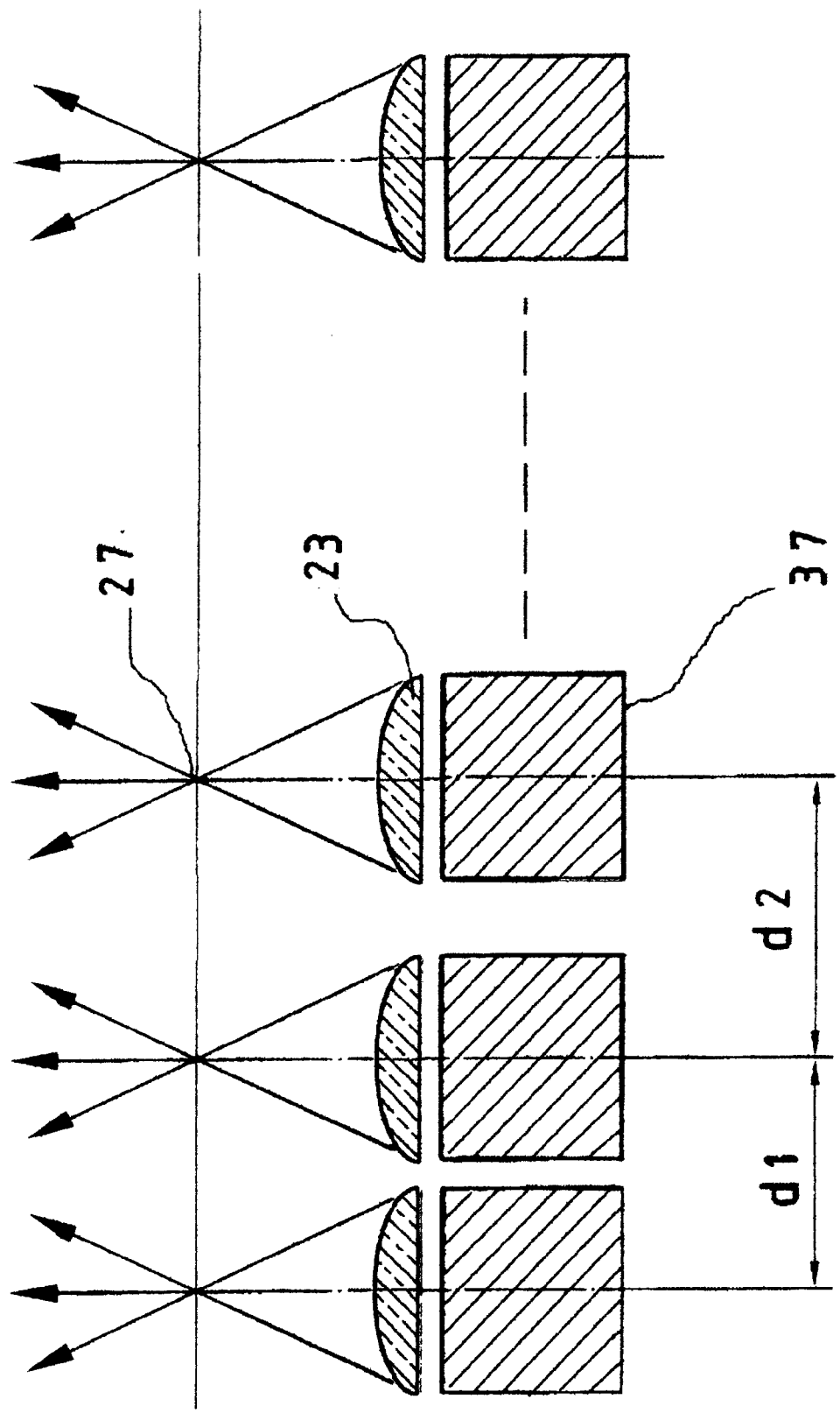
FIG. 30 illustrates the phased-array constructed with large size phase-controlled light emitters and lenses.
Figure 31:
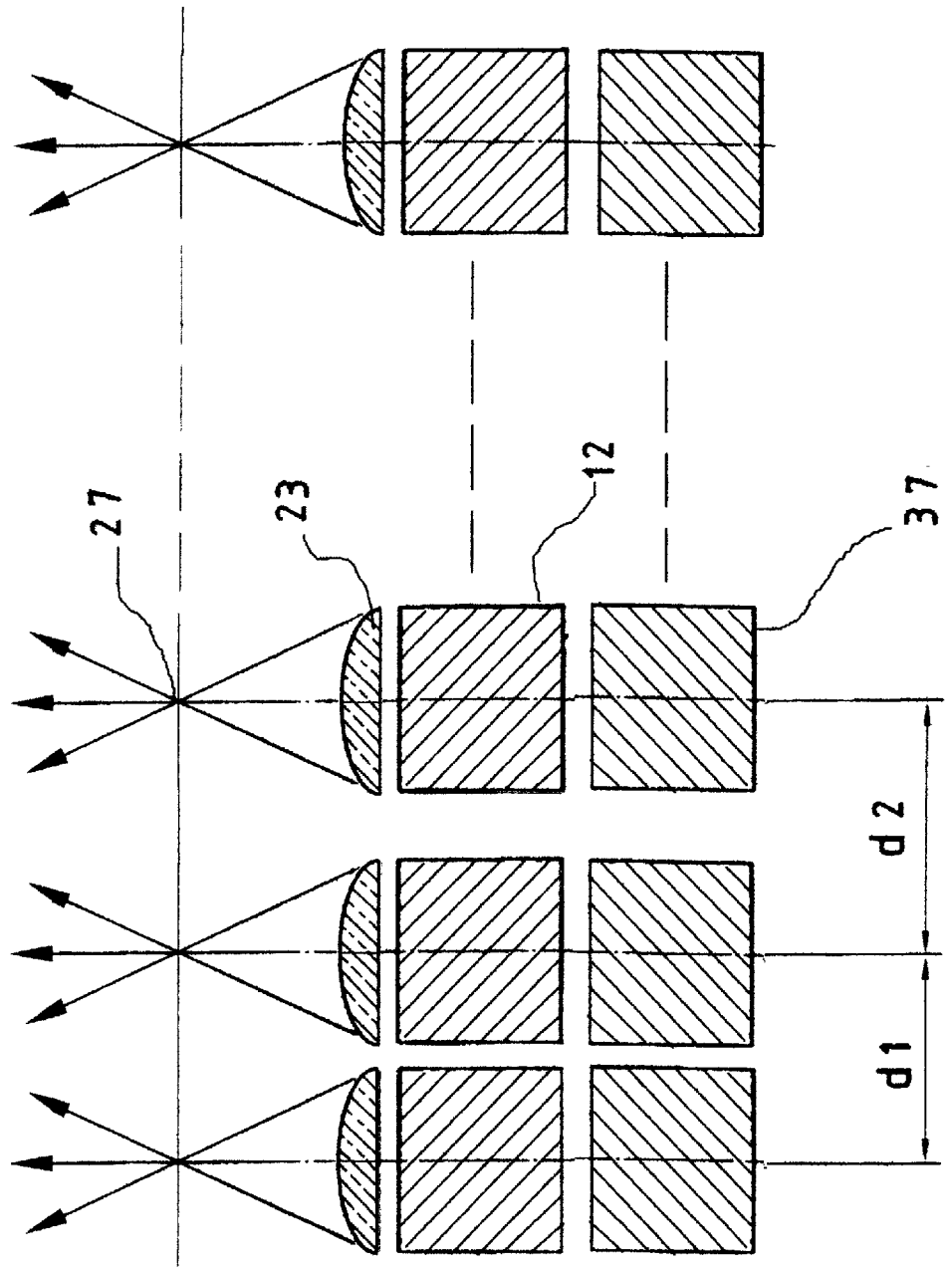
FIG. 31 illustrates the phased-array constructed with large size phase-controlled light emitters, phase-modulators and lenses.

FIG. 29, FIG. 30 and FIG. 31 illustrate the irregular phased-array based on phase-controlled light emitter. FIG. 29 illustrates the irregular phased-array constructed with small size light emitter 37. The irregular array is formed with the irregular placement of the light emitter itself. When the size the light emitter is comparable to the wavelength, the light will divergent significantly, therefore no lens is needed. Since the light emitter itself can control the phase of the light, no extra electro-optical phase-modulator, as described before, is needed.

When the size the light emitter is large, lens 23 is needed to diverge the light as shown in FIG. 30. The method of virtual array of effective point source of light mentioned above can be used to create the irregular phased-array. For the same reason as mentioned above, the electro-optical phase-modulator is not needed. If the light emitter dose not have enough phase control capability, for example, if the light from the light emitter can only maintain a fixed phase relationship with each other, or even a fixed phase relationship can not be maintained, then the phase-modulator 12 as described before will be needed, as shown in FIG. 31. When the light emitter can not maintain a fixed phase relationship with each other for a long period of time, it is still possible to use the method shown in FIG. 31 , as long as the phase of the light from the emitter is stable enough for a certain period of time. In this case, we can measure the change of the phase relationship among the light from the light emitter after every short period, can dynamically compensate the drafting of the phase.

The various methods describe above, including the placement of the phase-controlled element, virtual effective point source of light and sub-array can also be used for the irregular phased-array constructed with phase-controlled light emitter. Since this is obvious, we do not repeat the description here.

In the above, we have described the method, feature and advantage of the present invention with assistant of the

What is claimed is:

1. An optical irregular phased-array device, comprising of an array of phase-controlled elements, a controller and control lines connecting the said controller and the said array of phase-controlled elements, the effective positions of the said phase-controlled elements are randomly arranged to form a known irregular pattern, wherein the average distance between the effective positions of adjacent phase-controlled elements is substantially greater than the wavelength of the light to be steered by the said phased-array.

2. The device according to claim 1, wherein the said array of phase-controlled elements comprises an array of electro-optical phase-modulators.

3. The device according to claim 2, wherein the said phased-controlled element further includes a lens or a mirror at least one of them, and the focal points or the virtual focal points of the said lenses or mirrors of the plurality of the said phase-controlled elements form an irregular array.

4. The device according to claim 3, wherein the said lens is a diverging lens or a converging lens, at least one of them.

5. The device according to claim 4, wherein the said lens is an asymmetrical lens.

6. The device according to claim 3, wherein the said mirror is a concave mirror or a plan mirror.

7. The device according to claim 6, wherein the said concave mirror is an asymmetrical mirror.

8. The device according to claim 6, wherein the optical axis of the said mirror is tilted relative to the normal direction of the phase-array.

9. The device according to claim 1, wherein the said phase-controlled elements form a regular array.

10. The device according to claim 1, wherein the said irregular phased-array is a two-dimensional irregular phased-array.

11. The device according to claim 10, wherein the said irregular pattern of the said effective positions of the said phase-controlled elements is a pattern wherein the said effective positions of the said phase-controlled elements are aligned in rows and columns with irregular distances between the rows and columns.

12. The device according to claim 2, wherein the said irregular phased-array comprises plurality of sub-arrays, the said sub-array comprises plurality of the said phase-controlled elements, the effective positions of the said phase-controlled elements in the said sub-array are randomly arranged to form a known irregular array, and the said irregular arrays of the effective positions of the said phase-controlled elements of the said sub-arrays are placed irregularly with respect to each other in the phased-array that is formed by the sub-arrays.

13. The device according to claim 12, wherein the said irregular phased-array comprises means for parallel controlling of the sub-arrays and independent controlling of each sub-array.

14. The device according to claim 13, wherein the said means of independent controlling of each sub-array including independent common electrode for the phase-modulators of the phase-controlled elements of each sub-array, and means to independently control the common electrode of each sub-array.

15. The device according to claim 13, wherein the said means of independent controlling of each sub-array including an additional sub-array phase-compensation phase-modulator for each sub-array, and means of independently control the sub-array phase-compensation phase-modulator of each sub-array.

16. The device according to claim 12, wherein the said irregular phased-array is a two-dimensional irregular phased-array.

17. The device according to claim 16, wherein the said irregular array of the said effective positions of the said phase-controlled elements of each sub-array is a such pattern that the said effective positions of the said phase-controlled elements are aligned in rows and columns with irregular distances between rows and columns.

18. The device according to claim 17, wherein the said array of electro-optical phase-modulators including a two-dimensional phase-modulators that are formed with two cross cascaded one-dimensional arrays phase-modulators.

19. The device according to claim 18, wherein the said one-dimensional array of phase-modulators including longitudinal phase-modulators or transverse phase-modulators, at least one of the two.

20. The device according to claim 1, wherein the average distance between the effective positions of adjacent phase-controlled elements is more than ten times of the wavelength of the light which the phase-array is concerned for.

21. The device according to claim 1, wherein the said phase-controlled elements are placed in a regular pattern with the center-to-center distance between adjacent phase-controlled elements equal to the average distance between the effective positions of adjacent phase-controlled elements, and the effective position of a phase-controlled element is randomly located with equal probability around the geometric center of the phase-controlled element.

22. The device according to claim 2, wherein the said array of electro-optical phase-modulators including a two-dimensional array of electro-optical phase-modulators formed with two groups of strip-electrodes, which are cross to each other, at the two sides of an electro-optical material respectively.

23. An optical phased-array device, comprising means of generating an array of virtual effective point-source of light, and means of modulating the phase of the light for each said virtual effective point-source of light.

24. The device according to claim 23, wherein the said means of generating an array of virtual effective point-source of light including an array of lenses or an array of mirrors, at least one of them.

25. The device according to claim 24, wherein the said array of virtual effective point-source of light is an irregular array, and the average distance between the adjacent effective point-source of lights is greater than ten times of the wavelength of the light which the said phased-array is concerned for; the said means of modulating the phase of the light for each said virtual effective point-source of light including electro-optical phase-modulator.

26. The device according to claim 25, wherein the said lenses or mirrors form a regular array while their focal points form an irregular array; the said lenses or mirrors are in general asymmetrical.

27. The device according to claim 26, wherein the said irregular array of virtual effective point-source of light is a two-dimensional irregular array.

28. The device according to claim 27, wherein the said virtual effective point-source of light are aligned in rows and columns with irregular distances between the rows and columns.

29. The device according to claim 28, wherein the said irregular array of virtual effective point-source of light comprises of plurality of identical irregular sub-arrays, each sub-array comprises plurality of virtual effective point-source of light, the placement of the said irregular sub-arrays is also irregular with respect to each other in the said irregular array of virtual effective point-source of light.

30. The device according to claim 29, wherein the said means of modulating the phase of the light for each said virtual effective point-source of light including the means of modulating the sub-arrays in parallel and the means of modulating each sub-array independently.

31. The device according to claim 30, wherein the said means of modulating each sub-array independently including a common electrode for the said electro-optical phase-modulators in each sub-array independent of other sub-arrays, and an additional sub-array phase-compensation phase-modulator for each sub-array, at least, one of the two means.

32. The device according to claim 31, wherein the said phase-modulators in each sub-array form a regular array.

33. An optical irregular phased-array device, comprising plurality of substantially identical irregular sub-arrays, each said irregular sub-array comprises plurality of phase-controlled elements whose effective positions form an irregular array within each sub-array, the average distance between the effective positions of adjacent phase-controlled elements is substantially greater than the wavelength of the light which the said phased-array is concerned for, the said irregular arrays of the effective positions of the phase-controlled elements of said sub-arrays are placed irregularly with respect to each other in the said irregular phased-array; the said irregular phased-array further comprises means of defining the said effective position of each phase-controlled element; the said irregular phased-array further comprises means for control of the sub-arrays in parallel and means for control of each sub-array independently.

34. The device according to claim 33, wherein the said phase-controlled element comprises electro-optical phase-modulator, the said means for control of the sub-arrays in parallel comprises the parallel linkage of the control-electrodes of the said phase-modulators at the corresponding positions in each sub-array; the said means for control of each sub-array independently comprises an independent common electrode for the said phase-modulators of each sub-array independently with respect to the common electrodes of the phase-modulators of other sub-arrays, and an additional sub-array phase-compensation phase-modulator for each sub-array, which can be controlled independently with respect to the additional sub-array phase-compensation phase-modulators of other sub-arrays, at least one of the two means.

35. The device according to claim 34, wherein the said means of defining the said effective position of each phase-controlled element comprises a lens or a mirror for each phase-controlled element at least one of them.

36. The device according to claim 35, wherein the said irregular placement of the said irregular arrays of the effective positions of the phase-controlled elements of said sub-arrays comprises means of placing the arrays of said electro-optical phase-modulators of each sub-arrays regularly with respect to each other.

37. The device according to claim 36, wherein the said lens or mirror including asymmetrical lens or mirror.

38. The device according to claim 37, wherein the said irregular phased-array is a two-dimensional phased-array that comprises plurality of two-dimensional irregular sub-arrays.

39. The device according to claim 38, wherein the said effective positions of the phase-controlled elements in each sub-array are aligned in rows and column with irregular distances between the rows and columns.

40. The device according to claim 35, wherein the said lens or mirror including cylindrical lens or cylindrical mirror.

* * * * *